United States Patent
Wu et al.

(10) Patent No.: US 9,788,018 B2
(45) Date of Patent: Oct. 10, 2017

(54) ERROR CONCEALMENT TECHNIQUES IN VIDEO DECODING

(75) Inventors: Yongjun Wu, Redmond, WA (US); Naveen Thumpudi, Sammamish, WA (US); Daniel Dinu, Redmond, WA (US); William R. Sanders, Stanwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1164 days.

(21) Appl. No.: 12/217,039

(22) Filed: Jun. 30, 2008

(65) Prior Publication Data
US 2009/0323826 A1 Dec. 31, 2009

(51) Int. Cl.
H04N 7/12 (2006.01)
H04N 19/895 (2014.01)

(52) U.S. Cl.
CPC .................................. H04N 19/895 (2014.11)

(58) Field of Classification Search
CPC ........... H04N 7/26; H04N 7/12; H04N 19/895
USPC ............. 375/240.16, 240.26, 240.25–240.27
See application file for complete search history.

(56) References Cited

U.S. PATENT DOCUMENTS

| | | | |
|---|---|---|---|
| 5,475,389 A | 12/1995 | Song et al. | |
| 5,568,200 A | 10/1996 | Pearlstein et al. | |
| 5,650,781 A | 7/1997 | Park | |
| 5,724,446 A | 3/1998 | Liu et al. | |
| 6,005,982 A | 12/1999 | Abe | |
| 6,151,034 A | 11/2000 | Jain | |
| 6,272,180 B1 | 8/2001 | Lei | |
| 6,275,239 B1 | 8/2001 | Ezer et al. | |
| 6,275,964 B1 | 8/2001 | Nagin et al. | |
| 6,323,904 B1 | 11/2001 | Knee | |
| 6,404,817 B1 | 6/2002 | Saha et al. | |

(Continued)

FOREIGN PATENT DOCUMENTS

| | | |
|---|---|---|
| WO | WO 2006020019 A1 | 2/2006 |
| WO | WO 2006/111915 | 10/2006 |

(Continued)

OTHER PUBLICATIONS

Chung et al., "DCT Based Error Concealment for RTSP Video Over a Modem Internet Connection," *Proceedings of the 1998 IEEE International Symposium on Circuits and Systems*, 4 pp. (1998).

(Continued)

*Primary Examiner* — Francis G Geroleo
*Assistant Examiner* — Richard Carter
(74) *Attorney, Agent, or Firm* — Klarquist Sparkman, LLP

(57) ABSTRACT

Error concealment techniques for video decoding are described. For example, a video decoder after finding a corrupted picture in a bit stream, finds a suitable neighbor for the corrupted picture. For example, the video decoder favors pictures with the same parity as the corrupted picture and considers picture order count and picture corruption in choosing a neighbor. The decoder then modifies syntax elements for the encoded video in the bit stream to allow the neighbor to be used in concealing the corruption in the corrupted picture. The modification of syntax elements can depend on the particular video decoder implementation. For example, in a software-only multithreaded video decoder, a task graph is modified, while in a system utilizing video acceleration, syntax elements for reference lists are modified.

24 Claims, 20 Drawing Sheets

(56) References Cited

U.S. PATENT DOCUMENTS

| | | |
|---|---|---|
| 6,417,910 B1 | 7/2002 | Mead |
| 6,470,049 B1 | 10/2002 | Nguyen |
| 6,522,694 B1 | 2/2003 | Ryan |
| 6,748,020 B1 | 6/2004 | Eifrig et al. |
| 6,763,192 B1 | 7/2004 | Jagannathan |
| 6,993,202 B2 | 1/2006 | Igarashi et al. |
| 7,068,722 B2 | 6/2006 | Wells |
| 7,113,542 B2 | 9/2006 | Tanaka |
| 7,149,247 B2 | 12/2006 | Sullivan |
| 7,184,100 B1 | 2/2007 | Wilf et al. |
| 7,496,282 B2 | 2/2009 | Kochale |
| 7,500,240 B2 * | 3/2009 | Shoemaker et al. .......... 718/102 |
| 7,707,334 B2 | 4/2010 | Wang et al. |
| 7,742,532 B2 | 6/2010 | Jeon |
| 7,751,473 B2 | 7/2010 | Hannuksela |
| 7,792,374 B2 | 9/2010 | Ohira |
| 8,300,702 B2 | 10/2012 | Yamazaki |
| 2002/0069038 A1 | 6/2002 | Cooper |
| 2002/0141502 A1 | 10/2002 | Lin et al. |
| 2003/0112333 A1 | 6/2003 | Chen |
| 2003/0156652 A1* | 8/2003 | Wise et al. ............... 375/240.26 |
| 2004/0032908 A1 | 2/2004 | Hagai et al. |
| 2004/0047614 A1 | 3/2004 | Green |
| 2004/0101055 A1 | 5/2004 | Hourunranta |
| 2004/0139462 A1 | 7/2004 | Hannuksela et al. |
| 2004/0179619 A1* | 9/2004 | Tian ................. H04N 21/23406 375/240.26 |
| 2004/0185775 A1 | 9/2004 | Bell et al. |
| 2004/0190617 A1* | 9/2004 | Shen et al. ............... 375/240.16 |
| 2004/0247030 A1* | 12/2004 | Wiethoff ................. 375/240.16 |
| 2004/0258151 A1 | 12/2004 | Spampinato |
| 2005/0025463 A1 | 2/2005 | Bloom et al. |
| 2005/0089104 A1 | 4/2005 | Kim |
| 2005/0094729 A1 | 5/2005 | Yuan et al. |
| 2005/0123057 A1 | 6/2005 | MacInnis et al. |
| 2005/0232359 A1 | 10/2005 | Cha |
| 2005/0278502 A1 | 12/2005 | Hundley |
| 2006/0002479 A1 | 1/2006 | Fernandes |
| 2006/0013318 A1 | 1/2006 | Webb et al. |
| 2006/0039475 A1 | 2/2006 | Liu et al. |
| 2006/0045190 A1 | 3/2006 | Sun et al. |
| 2006/0059510 A1 | 3/2006 | Huang et al. |
| 2006/0062304 A1 | 3/2006 | Hsia |
| 2006/0088107 A1 | 4/2006 | Cancemi et al. |
| 2006/0098732 A1 | 5/2006 | Bruna et al. |
| 2006/0104366 A1 | 5/2006 | Huang et al. |
| 2006/0133770 A1 | 6/2006 | Shibata et al. |
| 2006/0146940 A1 | 7/2006 | Gomila et al. |
| 2006/0233239 A1 | 10/2006 | Sethi et al. |
| 2006/0251177 A1 | 11/2006 | Webb |
| 2007/0014359 A1 | 1/2007 | Gomila et al. |
| 2007/0030911 A1 | 2/2007 | Yoon |
| 2007/0033494 A1 | 2/2007 | Wenger et al. |
| 2007/0053445 A1 | 3/2007 | Schaar et al. |
| 2007/0073779 A1 | 3/2007 | Walker et al. |
| 2007/0086526 A1 | 4/2007 | Koto et al. |
| 2007/0091997 A1 | 4/2007 | Fogg et al. |
| 2007/0098080 A1 | 5/2007 | Diard et al. |
| 2007/0116128 A1 | 5/2007 | Evans et al. |
| 2007/0118544 A1 | 5/2007 | Lundquist et al. |
| 2007/0136779 A1 | 6/2007 | Tsushima |
| 2007/0153898 A1 | 7/2007 | Yim |
| 2007/0177678 A1 | 8/2007 | Subramania et al. |
| 2007/0211055 A1 | 9/2007 | Stein et al. |
| 2007/0223595 A1 | 9/2007 | Hannuksela |
| 2007/0242080 A1 | 10/2007 | Hamada |
| 2008/0002773 A1 | 1/2008 | Lai |
| 2008/0049844 A1* | 2/2008 | Liu ....................... H04N 19/61 375/240.27 |
| 2008/0049845 A1* | 2/2008 | Liu ........................ 375/240.27 |
| 2008/0107184 A1* | 5/2008 | Katsavounidis et al. ......... 375/240.25 |
| 2008/0130754 A1 | 6/2008 | Winger |
| 2009/0052858 A1 | 2/2009 | Date |
| 2009/0074075 A1 | 3/2009 | Au |
| 2009/0147854 A1* | 6/2009 | Dane ..................... H04N 5/145 375/240.16 |
| 2012/0147956 A1 | 6/2012 | Katsavounidis et al. |
| 2013/0077690 A1 | 3/2013 | Wei et al. |

FOREIGN PATENT DOCUMENTS

| | | |
|---|---|---|
| WO | WO 2006111063 A1 | 10/2006 |
| WO | WO 2006134110 A1 | 12/2006 |

OTHER PUBLICATIONS

Lee et al., "Error-Resilient Image Coding (ERIC) with Smart-IDCT Error Concealment Technique for Wireless Multimedia Transmission," *IEEE Transactions on Circuits and Systems for Video Technology*, vol. 13, No. 2, pp. 176-181 (Feb. 2003).

Park et al., "Content-Based Adaptive Spatio-Temporal Methods for MPEG Repair," *IEEE Transactions on Image Processing*, vol. 13, No. 8, pp. 1066-1077 (Aug. 2004).

Patel et al., "Performance of a Software MPEG Video Decoder," *ACM Proc.*, 8 pp. (1993).

Shen et al., "Accelerate Video Decoding With Generic GPU," *IEEE Transactions on Circuits and Systems for Video Technology*, vol. 15, No. 5, pp. 685-693 (May 2005).

Swann, "Resilient Video Coding for Noisy Channels," *IEEE Colloquium on Data Compression: Methods and Implementations*, 5 pp. (1999).

Nemethova et al., "Flexible Error Concealment for H.264 Based on Directional Interpolation," *IEEE Proceedings of the WirelessCom Conference on Wireless Networks, Communications and Mobile Computing*, Jun. 2005, 6 pages.

Su et al., "Improved Error Concealment Algorithms Based on H.264/AVC Non-normative Decoder," *2004 IEEE International Conference on Multimedia and Expo*, Jun. 2004, 4 pages.

Thomos et al., "Error-Resilient Transmission of H.264/AVC Streams Using Flexible Macroblock Ordering," *The 2nd European Workshop on the Integration of Knowledge, Semantics and Digital Media Technology*, 2005, 7 pages.

Bordoloi et al., "Hardware Accelerated Interactive Vector Field Visualization: A level of detail approach," *Eurographics* 2002, vol. 21, No. 3, 10 pp. (2002).

Digit-Life, "AMD/ATI and NVIDIA Graphics Cards in Video Decoding Tasks," Jun. 25, 2007, http://www.digit-life.com/articles2/video/video.dec.2007-page1.html, 9 pages.

Fiedler, "Implementation of a Basic H.264/AVC Decoder," Chemnitz University of Technology, Faculty of Computer Science, Seminar Paper, 28 pp. (Jun. 1, 2004).

Geomantics, "GenesisIV Tutorial: Startup issues," http://www.geomantics.com/tutorial22.htm, visited on Sep. 24, 2008, 3 pages.

"H.264/MPEG-4 AVC," Wikipedia, 8 pp., May 27, 2009. http://en.wikipedia.org/wiki/H.264.

ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241, 552 pp. (Jul. 2006).

Marpe, "The H.264/MPEG4 Advanced Video Coding Standard and Its Applications," *IEEE Communications Magazine, Standards Report*, 10 pp. (Aug. 2006).

Microsoft Corporation, "Error Message: CONF Caused a Divide Error in Module Msvfw32.dll," http://support.microsoft.com/kb/263031, Oct. 2006, 2 pages.

Microsoft Corporation, "Microsoft Windows XP Professional Resource Kit, Second Edition," 28 pp. (Jun. 11, 2003).

Sonic Solutions, "CinePlayer™ DVD Decoder Pack for Windows® XP," http://www.sonic.com/products/Consumer/CinePlayer/Technology/acceleration.aspx , © 2007, visited on Sep. 24, 2008, 10 pages.

Sullivan, "Seven Steps Toward a More Robust Codec Design," JVT-C117, 7 pp. (May 2002).

(56) References Cited

OTHER PUBLICATIONS

Sullivan et al., "The H.264/AVC Advanced Video Coding Standard: Overview and Introduction to the Fidelity Range Extensions," *SPIE Conference on Applications of Digital Image Processing XXVII, Special Session on Advances in the New Emerging Standard*, 21 pp. (Aug. 2004).
The Elder Geek on Windows XP, "Camtasia Why Playback is Black" http://www.theeldergeek.com/forum/lofiversion/index.php?t15009.html, 5 pp. (Dec. 2005).
Wang et al., "A Platform-Based MPEG-4 Advanced Video Coding (AVC) Decoder with Block Level Pipelining," *Proceedings of the 2003 Joint Conference of the Fourth International Conference on Information, Communications and Signal Processing, and the Fourth Pacific Rim Conference on Multimedia*, vol. 1, Issue 15-18, pp. 51-55 (Dec. 2003).
Wang et al., "Isolated Regions: Motivations, Problems, and Solutions," JVT-0072, 13 pp. (May 2002).
Wang et al., "Real-time Video Communications over Unreliable Networks," *IEEE Signal Processing Magazine*, vol. 17, No. 4, pp. 61-82 (Jul. 2000).
U.S. Appl. No. 11/858,787.
U.S. Appl. No. 12/061,567.
U.S. Appl. No. 12/217,037.
U.S. Appl. No. 12/505,444.
U.S. Appl. No. 12/323,055.
U.S. Appl. No. 13/726,474.

* cited by examiner software 180 implementing one or more innovations in error detection, error recovery or error concealment during video decoding

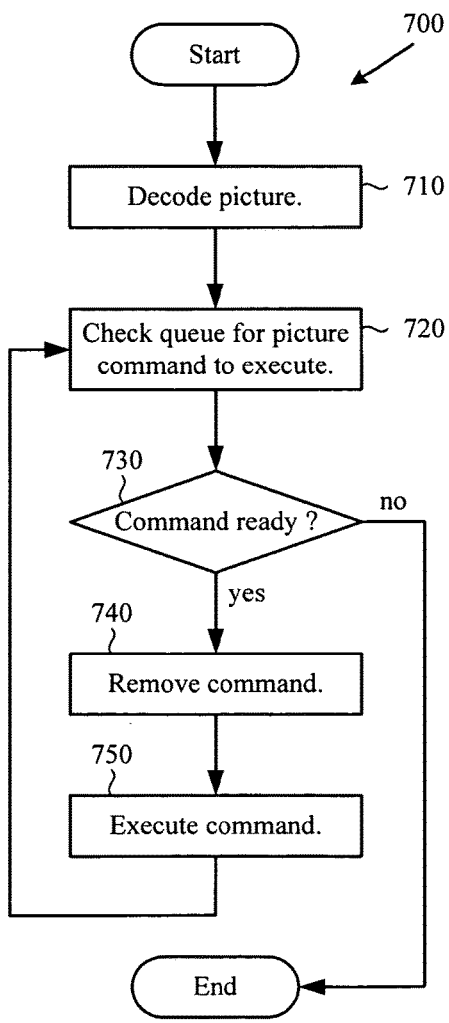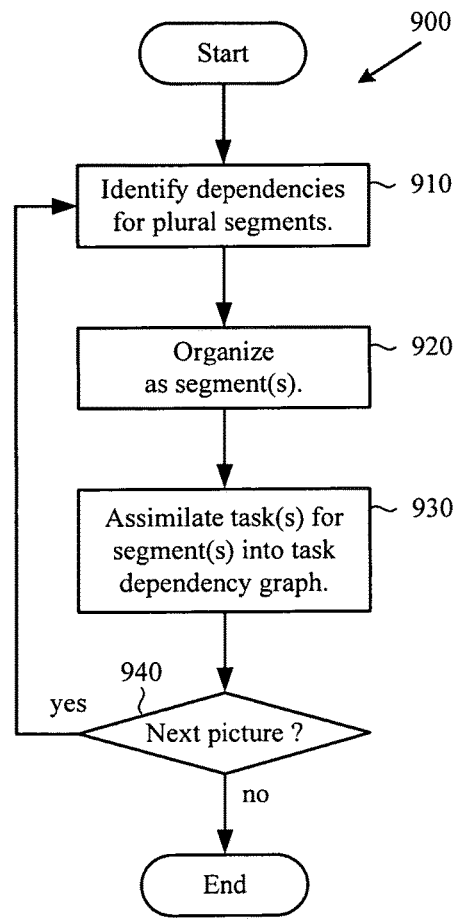

Figure 8
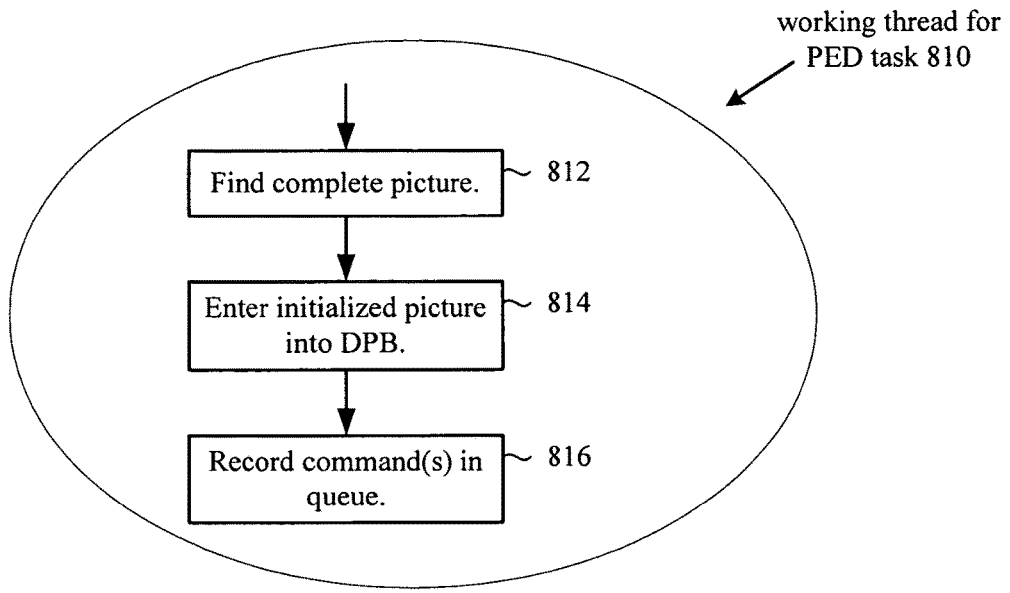
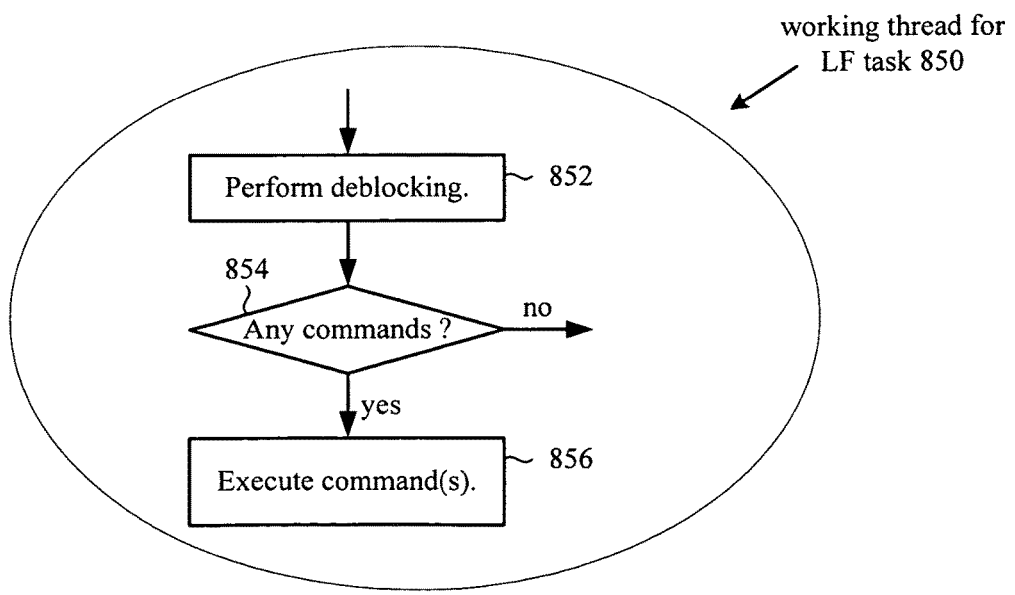

When PED has not spawned a picture:

When picture has been spawned but not entered task graph:

When picture has entered task graph but not DPB:

When picture is in task graph and DPB:

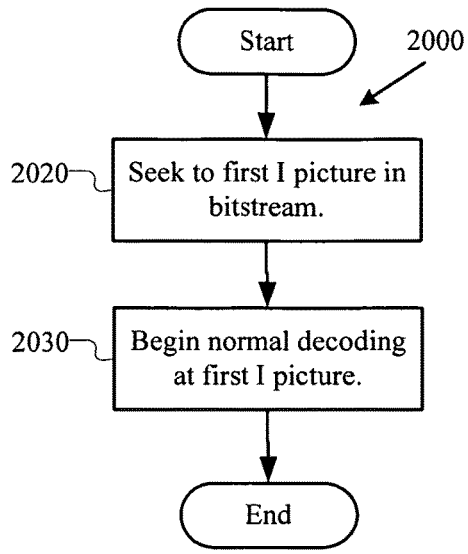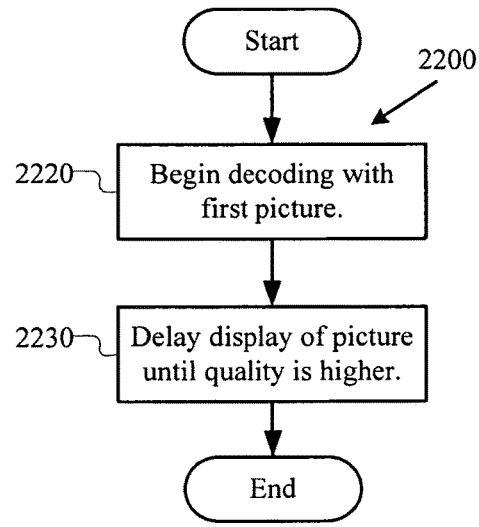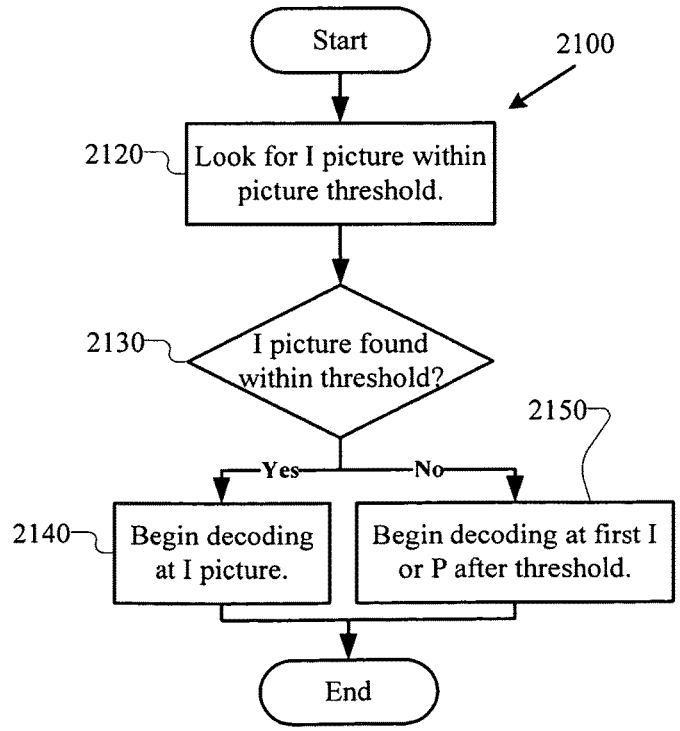

ERROR CONCEALMENT TECHNIQUES IN VIDEO DECODING

BACKGROUND

Companies and consumers increasingly depend on computers to process, distribute, and play back high quality video content. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

In general, video compression techniques include "intra-picture" compression and "inter-picture" compression. Intra-picture compression techniques compress a picture with reference to information within the picture, and inter-picture compression techniques compress a picture with reference to a preceding and/or following picture (often called a reference or anchor picture) or pictures.

For intra-picture compression, for example, an encoder splits a picture into 8×8 blocks of samples, where a sample is a number that represents the intensity of brightness or the intensity of a color component for a small, elementary region of the picture, and the samples of the picture are organized as arrays or planes. The encoder applies a frequency transform to individual blocks. The frequency transform converts an 8×8 block of samples into an 8×8 block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for an 8×8 block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector ("MV")). In general, motion compensation is a process of reconstructing pictures from reference picture(s) using motion data.

The example encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for an 8×8 block of samples of an intra-compressed picture, an example decoder reconstructs a block of quantized transform coefficients. The example decoder and encoder perform inverse quantization and an inverse frequency transform to produce a reconstructed version of the original 8×8 block of samples.

As another example, the example decoder or encoder reconstructs an 8×8 block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes an 8×8 predicted block using motion vector information for displacement from a reference picture. The decoder/encoder then combines the predicted block with the reconstructed residual to form the reconstructed 8×8 block.

I. Video Codec Standards

Over the last two decades, various video coding and decoding standards have been adopted, including the H.261, H.262 (MPEG-2) and H.263 series of standards and the MPEG-1 and MPEG-4 series of standards. More recently, the H.264 standard (sometimes referred to as AVC or JVT) and VC-1 standard have been adopted. For additional details, see representative versions of the respective standards.

Such a standard typically defines options for the syntax of an encoded video bit stream according to the standard, detailing the parameters that must be in the bit stream for a video sequence, picture, block, etc. when particular features are used in encoding and decoding. The standards also define how a decoder conforming to the standard should interpret the bit stream parameters—the bit stream semantics. In many cases, the standards provide details of the decoding operations the decoder should perform to achieve correct results. Often, however, the low-level implementation details of the operations are not specified, or the decoder is able to vary certain implementation details to improve performance, so long as the correct decoding results are still achieved. Moreover, many standards fail to address in a satisfactory way, or only partially address, how a decoder should react when it detects errors in a bit stream, how the decoder should recover from such errors, and how the decoder should conceal such errors.

During development of a standard, engineers may concurrently generate reference software, sometimes called verification model software or JM software, to demonstrate rate-distortion performance advantages of the various features of the standard. Typical reference software provides a "proof of concept" implementation that is not algorithmically optimized or optimized for a particular hardware platform. Moreover, typical reference software does not address multithreading implementation decisions, instead assuming a single threaded implementation for the sake of simplicity. Often, reference software fails to address in a satisfactory way, or only partially addresses, issues of error detection, recovery and concealment, especially when such issues surface during multithreaded decoding.

II. Acceleration of Video Decoding and Encoding

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video). In particular, decoding tasks according to more recent standards such as H.264 and VC-1 can be computationally intensive and consume significant memory resources.

Some decoders use video acceleration to offload selected computationally intensive operations to a graphics processor. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

In a typical software architecture for video acceleration during video decoding, a video decoder controls overall decoding and performs some decoding operations using a host CPU. The decoder signals control information (e.g., picture parameters, macroblock parameters) and other information to a device driver for a video accelerator (e.g., with GPU) across an acceleration interface.

The acceleration interface is exposed to the decoder as an application programming interface ("API"). The device driver associated with the video accelerator is exposed through a device driver interface ("DDI"). In an example interaction, the decoder fills a buffer with instructions and information then calls a method of an interface to alert the device driver through the operating system. The buffered instructions and information, opaque to the operating system, are passed to the device driver by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder and device driver, an interface specification can define a protocol for instructions and information for decoding according to a particular video decoding standard or product. The decoder follows specified conventions when putting instructions and information in a buffer. The device driver retrieves the buffered instructions and information according to the specified conventions and performs decoding appropriate to the standard or product. An interface specification for a specific standard or product is adapted to the particular bit stream syntax and semantics of the standard/product.

Thus, acceleration of video decoding often improves computational performance by offloading selected computationally intensive operations. Existing approaches fail to address in a satisfactory way, however, or only partially addresses, how to handle issues of error detection, recovery and concealment that surface during decoding with video acceleration.

Given the critical importance of video compression and decompression to digital video, it is not surprising that compression and decompression are richly developed fields. Whatever the benefits of previous techniques and tools, however, they do not have the advantages of the following techniques and tools.

SUMMARY

In summary, techniques and tools are described for various aspects of error concealment in video decoder implementations. These techniques and tools help, for example, to efficiently conceal errors detected during video decoding.

In one aspect of the techniques and tools described herein, a multithreaded video decoder identifies a suitable neighbor picture for a current picture, the suitable neighbor picture being selected in a way that favors same parity as the current picture, decoded or set to be decoded, and found within one or more predetermined threshold distances away from the current picture. The decoder also adds a dependency between a task of the current picture and a task of the suitable neighbor picture to a task dependency data structure for the multithreaded video decoder. The decoder also, after completion of the task of the suitable neighbor picture, performs error concealment that includes using areas of the suitable neighbor picture in place of corrupted areas of the current picture.

In another aspect, a video decoder determines, from one or more pictures represented in a decoded picture buffer, whether a suitable neighbor picture for a current picture exists in the decoded picture buffer. The decoder also, when a suitable neighbor picture exists and is to be used for concealment, modifies one or more syntax elements of the encoded video to facilitate error concealment using the suitable neighbor picture during decoding of the current picture.

In another aspect, one or more storage media store software for a computer system to perform a method for concealing an error in a bitstream during decoding by a video decoder. The software comprises code for choosing, from one or more pictures represented in a decoded picture buffer, a suitable neighbor picture for a current picture and code for modifying one or more syntax elements of encoded video to facilitate concealment using the suitable neighbor picture during decoding of the current picture.

The various techniques and tools can be used in combination or independently. Additional features and advantages will be made more apparent from the following detailed description of different embodiments, which proceeds with reference to the accompanying figures.

BRIEF DESCRIPTION OF THE DRAWINGS

FIG. 7 is a flowchart illustrating a generalized technique for removing picture commands from a picture command queue in multithreaded decoding.

FIG. 8 is a diagram illustrating example picture command queue management processing in different decoding tasks.

FIG. 9 is a flowchart illustrating a generalized technique for creating a task dependency graph for segments of macroblocks.

FIGS. 19-22 are flowcharts illustrating generalized techniques for recovering from errors in video decoding.

DETAILED DESCRIPTION

Figure 1:
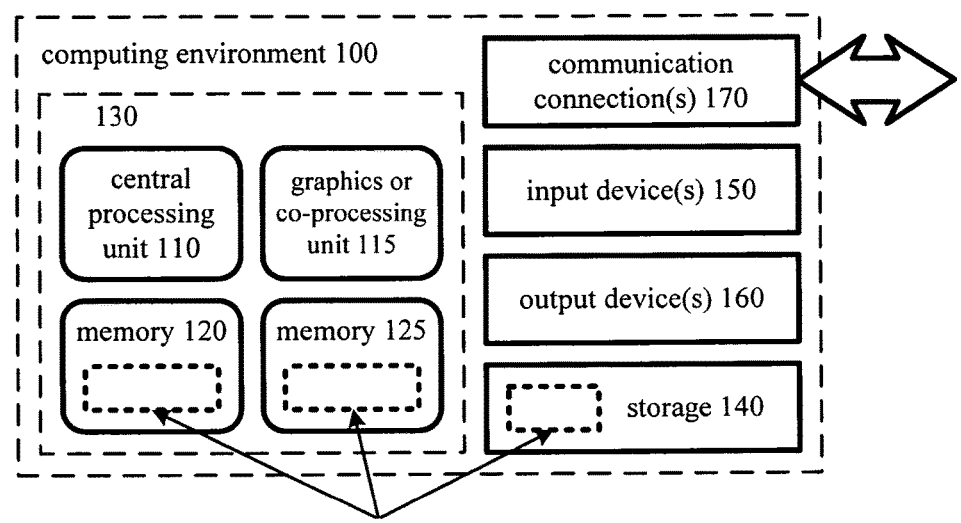
FIG. 1 is a block diagram illustrating a generalized example of a suitable computing environment in which several of the described embodiments may be implemented.

The present application relates to innovations in implementations of error detection, error recovery and/or error concealment in video decoders. Many of these innovations reduce decoding complexity and/or increase decoding speed to improve decoding performance. These innovations include:

1. An error handling and recovery framework providing strong error resilience.

2. Error detection and protection designed for execution in different tasks, such as network abstraction layer unit ("NALU") parsing, a picture extent discovery ("PED") task, an entropy decoding ("ED") task, a motion compensation ("MC") task, an intra-prediction ("INTRA") task and so on.

3. Error detection at macroblock ("MB") level, rather that at the level of decoding of each bit, using an ED engine with the design of added redundancy in ED buffers.

4. Error recovery for video decoding from an arbitrary position in a bit stream.

5. For error concealment, consistent choice of suitable neighbor picture across different platforms, as well as choice of suitable neighbor picture in conjunction with quality feedback.

6. Accounting for error concealment in task scheduling in multithreaded software decoding, using, for example, dynamic dependency edges.

7. Dynamic decision of pictures used for concealment in video decoding that uses video acceleration for performing MC or inverse frequency transforms.

8. Change of picture type, when errors are encountered, from I to P in certain types of video decoding with video acceleration.

9. Use of an additional GPU shader for error concealment in certain video decoding platforms.

10. Replacement of corrupted slice NALU in certain types of video decoding with video acceleration.

For example, in order to detect errors, conceal errors and recover from errors during video decoding, the decoding processes of a standard such as H.264 or VC-1 and implementations thereof are analyzed to identify opportunities. Specific examples of identified ways of improving error detection, concealment and recovery are described below. Some of these provide hardware-specific performance improvements. Additional improvements for multithreading implementations further improve error detection, concealment and recovery in multithreading implementations.

Collectively, these improvements are at times loosely referred to as "optimizations." As used conventionally and as used herein, the term "optimization" means an improvement that is deemed to provide a good balance of performance in a particular scenario or platform, considering computational complexity, memory use, processing speed, and/or other factors. Use of the term "optimization" does not foreclose the possibility of further improvements, nor does it foreclose the possibility of adaptations for other scenarios or platforms.

With these innovations, efficient decoder implementations have been provided for diverse platforms. The implementations include media players for gaming consoles with complex, special-purpose hardware and graphics capabilities, personal computers, and set-top boxes/digital video receivers.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, while several of the innovations described below are presented in terms of H.264/AVC decoding examples, the innovations are also applicable to other types of decoders (e.g., MPEG-2, VC-1) that provide or support the same or similar decoding features.

The various techniques and tools described herein can be used in combination or independently. For example, although flowcharts in the figures typically illustrate techniques in isolation from other aspects of decoding, the illustrated techniques in the figures can typically be used in combination with other techniques (e.g., shown in other figures). Different embodiments implement one or more of the described techniques and tools. Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

I. Computing Environment

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one CPU (110) and associated memory (120) as well as at least one GPU or other co-processing unit (115) and associated memory (125) used for video acceleration. In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. A host encoder or decoder process offloads certain computationally intensive operations (e.g., fractional sample interpolation for motion compensation, in-loop deblock filtering) to the GPU (115). The memory (120, 125) may be volatile memory (e.g., registers, cache, RAM), non-volatile memory (e.g., ROM, EEPROM, flash memory, etc.), or some combination of the two. The memory (120, 125) stores software (180) for a decoder implementing one or more of the decoder innovations described herein for error detection, concealment or recovery.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180).

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "decide," "make" and "get" to describe computer operations in a computing environment. These terms are high-level abstractions for operations performed by a computer, and should not be confused with acts performed by a human being. The actual computer operations corresponding to these terms vary depending on implementation.

II. Example Organization of Video Frames

For progressive video, lines of a video frame contain samples starting from one time instant and continuing through successive lines to the bottom of the frame. An interlaced video frame consists of two scan—one for the even lines of the frame (the top field) and the other for the odd lines of the frame (the bottom field). The "parity" of a field indicates whether the field is a top field or a bottom field. Two fields in different frames have the "same parity" if the two fields are both top fields or both bottom fields. Otherwise, the two fields have "opposite parity."

A progressive video frame can be divided into 16×16 macroblocks. For 4:2:0 format, a 16×16 macroblock includes four 8×8 blocks (Y0 through Y3) of luma (or brightness) samples and two 8×8 blocks (Cb, Cr) of chroma (or color component) samples, which are collocated with the four luma blocks but half resolution horizontally and vertically.

An interlaced video frame includes alternating lines of the top field and bottom field. The two fields may represent two different time periods or they may be from the same time period. When the two fields of a frame represent different time periods, this can create jagged tooth-like features in regions of the frame where motion is present.

Therefore, interlaced video frames can be rearranged according to a field structure, with the odd lines grouped together in one field, and the even lines grouped together in another field. This arrangement, known as field coding, is useful in high-motion pictures. For an interlaced video frame organized for encoding/decoding as separate fields, each of the two fields of the interlaced video frame is partitioned into macroblocks. The top field is partitioned into macroblocks, and the bottom field is partitioned into macroblocks. In the luma plane, a 16×16 macroblock of the top field includes 16 lines from the top field, and a 16×16 macroblock of the bottom field includes 16 lines from the bottom field, and each line is 16 samples long.

On the other hand, in stationary regions, image detail in the interlaced video frame may be more efficiently preserved without rearrangement into separate fields. Accordingly, frame coding is often used in stationary or low-motion interlaced video frames. An interlaced video frame organized for encoding/decoding as a frame is also partitioned into macroblocks. In the luma plane, each macroblock includes 8 lines from the top field alternating with 8 lines from the bottom field for 16 lines total, and each line is 16 samples long. For macroblock adaptive frame field ("MBAFF") coding, within a given macroblock, the top-field information and bottom-field information may be coded jointly or separately at any of various phases—the macroblock itself may be field-coded or frame-coded.

III. Generalized Video Decoder

Figure 2:
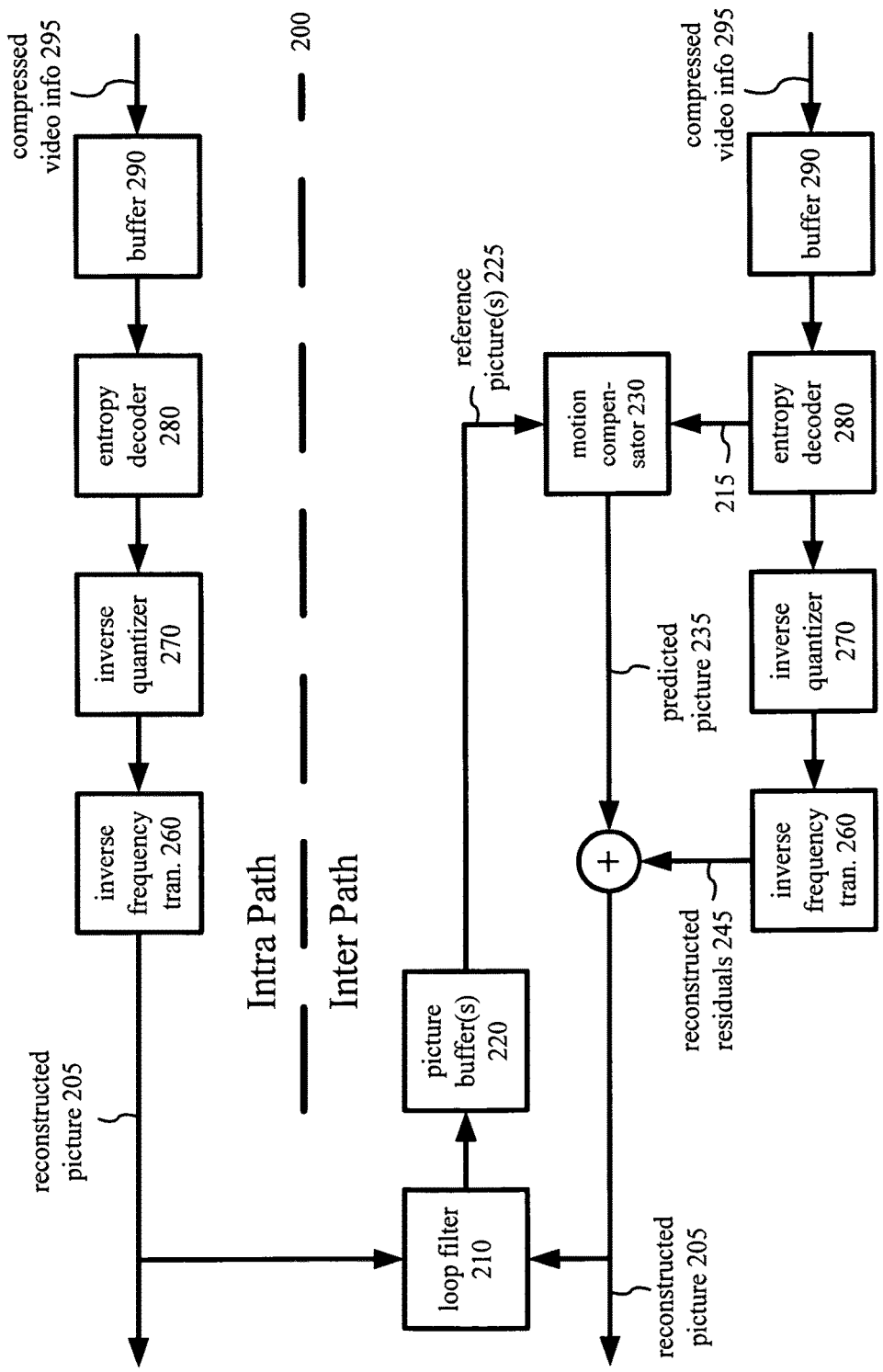
FIG. 2 is a block diagram of a generalized video decoder in conjunction with which several of the described embodiments may be implemented.

FIG. 2 is a block diagram of a generalized video decoder (200) in conjunction with which several described embodiments may be implemented. The relationships shown between modules within the decoder (200) indicate general flows of information in the decoder; other relationships are not shown for the sake of simplicity. In particular, while a decoder host performs some operations of modules of the decoder (200), in particular implementations a video accelerator performs other operations (such as inverse frequency transforms, fractional sample interpolation, motion compensation, in-loop deblocking filtering, color conversion, post-processing filtering and/or picture re-sizing). For example, the decoder (200) passes instructions and information to the video accelerator as described in "Microsoft DirectX VA: Video Acceleration API/DDI," version 1.01, a later version of "DXVA" or another acceleration interface. Different versions of a given video accelerator may perform different levels of decoding, as well. For example, "MoComp" or "IDCT" DXVA handles particular decoding tasks, such as motion compensation or inverse frequency transform, in the video accelerator, while "VLD" DXVA handles even entropy decoding in the video accelerator.

In general, once the video accelerator reconstructs video information, it maintains some representation of the video information rather than passing information back. For example, after a video accelerator reconstructs an output picture, the accelerator stores it in a picture store, such as one in memory associated with a GPU, for use as a reference picture. The accelerator then performs in-loop deblock filtering and fractional sample interpolation on the picture in the picture store.

In some implementations, different video acceleration profiles result in different operations being offloaded to a video accelerator. For example, one profile may only offload out-of-loop, post-decoding operations, while another profile offloads in-loop filtering, fractional sample interpolation and motion compensation as well as the post-decoding operations. Still another profile can further offload frequency transform operations. In still other cases, different profiles each include operations not in any other profile.

Returning to FIG. 2, the decoder (200) processes video pictures, which may be video frames, video fields or combinations of frames and fields. The bit stream syntax and semantics at the picture and macroblock levels may depend on whether frames or fields are used. The decoder (200) is block-based and uses a 4:2:0 macroblock format for frames. For fields, the same or a different macroblock organization and format may be used. 8×8 blocks may be further subdivided at different stages. Alternatively, the decoder (200) uses a different macroblock or block format, or performs operations on sets of samples of different size or configuration.

The decoder (200) receives information (295) for a compressed sequence of video pictures and produces output including a reconstructed picture (205) (e.g., progressive video frame, interlaced video frame, or field of an interlaced video frame). The decoder system (200) decompresses predicted pictures and key pictures. For the sake of presentation, FIG. 2 shows a path for key pictures through the decoder system (200) and a path for predicted pictures. Many of the components of the decoder system (200) are used for decompressing both key pictures and predicted pictures. The exact operations performed by those components can vary depending on the type of information being decompressed.

A demultiplexer (290) receives the information (295) for the compressed video sequence and makes the received information available to the entropy decoder (280). The entropy decoder (280) entropy decodes entropy-coded quantized data as well as entropy-coded side information, typically applying the inverse of entropy encoding performed in the encoder. A motion compensator (230) applies motion information (215) to one or more reference pictures (225) to form motion-compensated predictions (235) of sub-blocks, blocks and/or macroblocks of the picture (205) being reconstructed. One or more picture stores store previously reconstructed pictures for use as reference pictures.

The decoder (200) also reconstructs prediction residuals. An inverse quantizer (270) inverse quantizes entropy-decoded data. An inverse frequency transformer (260) converts the quantized, frequency domain data into spatial domain video information. For example, the inverse frequency transformer (260) applies an inverse block transform to sub-blocks and/or blocks of the frequency transform coefficients, producing sample data or prediction residual data for key pictures or predicted pictures, respectively. The inverse frequency transformer (260) may apply an 8×8, 8×4, 4×8, 4×4, or other size inverse frequency transform.

For a predicted picture, the decoder (200) combines reconstructed prediction residuals (245) with motion compensated predictions (235) to form the reconstructed picture (205). A motion compensation loop in the video decoder (200) includes an adaptive deblocking filter (210). The decoder (200) applies in-loop filtering (210) to the reconstructed picture to adaptively smooth discontinuities across block/sub-block boundary rows and/or columns in the picture. The decoder stores the reconstructed picture in a picture buffer (220) for use as a possible reference picture.

Generally, the functions of error detection, error concealment and error recovery are distributed among the modules of the decoder (200) shown in FIG. 2. For example, the demultiplexer (290) or other module, while performing operations as part of PED can scan encoded data in decoder buffers for bit-flip errors, checksum errors or missing NALUs. The entropy decoder (280) can detect errors (e.g., caused by bit-flips) during entropy decoding. The motion compensator (230) or other module can adjust pictures buffered in the picture buffer(s) (220) as part of error concealment. A controller (not shown) or other module in a decoder host can coordinate operations the demultiplexer (290), entropy decoder (280), motion compensator (230) and other modules as part of error detection, error recovery and error concealment.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of video decoders typically use a variation or supplemented version of the generalized decoder (200).

For the sake of presentation, the following table provides example explanations for acronyms and selected shorthand terms used herein.

| Term | Explanation |
|---|---|
| block | arrangement (in general, having any size) of sample values for pixel data or residual data, for example, including the possible blocks in H.264/AVC - 4x4, 4x8, 8x4, 8x8, 8x16, 16x8, and 16x16 |
| CABAC | context adaptive binary arithmetic coding |
| CAVLC | context adaptive variable length coding |
| DPB | decoded picture buffer |
| ED | entropy decoding |

| Term | Explanation |
| --- | --- |
| FIFO | first in first out |
| INTRA | spatial intra-prediction |
| LF | loop filtering |
| MB | megabyte OR macroblock, depending on context; a macroblock is, e.g., 16x16 arrangement of sample values for luma with associated arrangements of sample values for chroma |
| MBAFF | macroblock adaptive frame field |
| MC | motion compensation |
| MMCO | memory management control operation |
| NALU | network abstraction layer unit |
| PED | picture extent discovery |
| PICAFF | picture adaptive frame field |
| PPS | picture parameter set |
| PROG | progressive |
| SEI | supplemental enhancement information |
| SPS | sequence parameter set |
| stage (of decoding) | a set of different passes/steps to decode a picture, such as PED, ED, MC and so on |
| sub-block | a partition of a sub-MB, e.g., 8x4, 4x8 or 4x4 block or other size block |
| sub-MB | a partition of an MB, e.g., 16x8, 8x16 or 8x8 block or other size block; in some contexts, the term sub-MB also indicates sub-blocks |
| task | a stage plus input data |

IV. Multithreading Design Options for a Video Decoder

In some embodiments, a decoder uses one or more multithreading options when decoding video. Collectively, the multithreading options efficiently find opportunities for parallel processing in the bit stream and support fine-grained task scheduling in the decoding. Many of the innovations described herein for error detection, concealment and recovery address considerations that arise in multithreaded decoding implementations.

In contrast, naïve implementations of the reference code for the H.264 standard are single threaded and synchronous. A decoder parses the bit stream for a picture, initializes structures for the picture, decodes the pictures, and updates the decoded picture buffer, then moves on to the next picture. This is inefficient for many modern architectures and impractical for many H.264 decoding scenarios. Nevertheless, some of the innovations described herein for error detection, concealment and recovery (for example, the error recovery from an arbitrary start position) are also applicable to single-threaded, synchronous decoding implementations.

This section describes flexible multithreading models that incorporate different multithreading implementations. A PED module finds complete pictures in a bit stream, identifies opportunities for parallel processing, and simulates a "live" DPB as in a single threaded implementation so as to help order picture commands. A picture command queue facilitates pipeline picture decoding, potentially storing picture commands for pictures as those pictures are being decoded. A task scheduler distributes available tasks to different threads according to one of several available scheduling heuristics. An available task can process data for a picture, slice or other segment (collection of macroblocks). The multithreading models can be applied in a CPU+GPU architecture, multiple CPU architecture, or multiple CPU+GPU architecture.

A. Overall Multithreading Framework.

1. Layered Data Structures.

Figure 3:
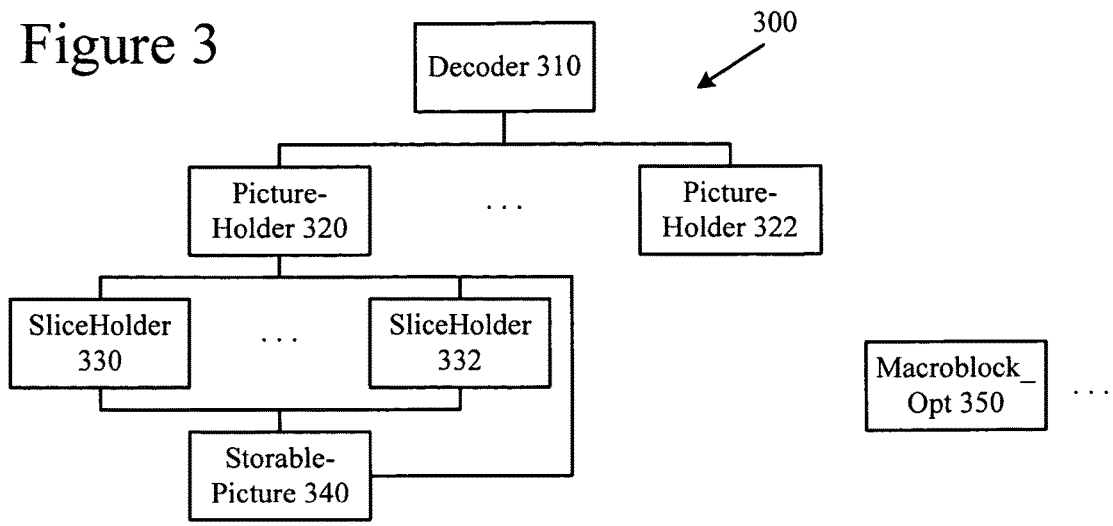
FIG. 3 is a diagram illustrating example layered data structures for multithreaded decoding.

The data structures used in multithreading are an important aspect of the overall design. In some embodiments, a multithreaded decoder uses layered data structures (300) as shown in FIG. 3. As FIG. 3 shows, the parameters of an encoded video bit stream are organized into layered/hierarchical data structures generally according to their lifetime in the decoding process.

The Decoder structure (310) (stMSH264Decoder_tag) holds parameters and data structures for the decoder. These parameters and structures basically have the decoder's lifetime. For example, it holds parameters and structures as follows.

| Structure/Parameter | Explanation |
| --- | --- |
| struct threading | holds the parameters for threading, such as pumped or not (pumpedDecoder), pumped PED running or not (bPEDTaskRunning), and so on. |
| struct ped | holds the necessary parameters for the process of PED, such as the temporary slice header parameters, temporal NALU parameters, parameters for field picture pairing, live DPB and so on. |
| struct pools | holds different memory pools, such as PictureHolder pool, neighbor availability table pool, SliceHolder pool, and so on. |
| struct stTaskDependencyGraph_tag | parameters for dependency graph |
| struct Manage_PIC_FIFO | parameters for picture command FIFO. |
| struct stOutFrm | parameters for circular output buffer. |
| timing stamp parameters | parameters for time stamps for pictures. |

The parameters in the Decoder structure (310) can be accessed by working threads. The parameters are based upon, for example, sequence parameters, and the parameters may change when a new SPS is processed.

A PictureHolder structure (320, 322) (stPictureHolder_tag) holds temporary parameters for decoding a picture and references other structures used in decoding the picture. Once a picture is decoded, some of the temporary picture parameters may be discarded. The decoded sample data for the picture (along with certain parameters used for reference purposes) are stored in a StorablePicture structure (340). For example, the picture parameters are divided into several categories. Pointers that point to live instances in decoder structure include pstStorablePicPool, pstMBOffsetTableVar, pstMBOffsetTableMBAFFVar and pPPS. Cache pointers that point to the real memories inside StorablePicture (340) include imgY, imgUV, pcRefIdx1, pnMv0. Picture parameters for the picture in PictureHolder (320, 322) include PicWidthInMbs, field_pic_flag, bottom_used_for_reference. The buffers/arrays are shared by different slices in the picture—these may be compressed buffer pointers, stream buffer pointers, slice parameter arrays (rgSliceOpt), macroblock arrays (mb_data_opt). A SliceHolder Xarray holds all the Sliceholders (330, 332) in this picture.

A StorablePicture structure (340) holds decoded pixel data, side information, and parameters for a reference picture and DPB management. The lifetime of a StorablePicture structure (340) is different from that of a PictureHolder structure (320, 322). A PictureHolder structure (320, 322) for a picture can be deallocated when the picture is decoded, since the parameters in the PictureHolder structure (320, 322) are used for decoding. The parameters and data in a StorablePicture structure (340) are valid until the corresponding picture is deleted from the decoder. For example, the StorablePicture structure (340) stores decoded picture data imgY, imgUV, ref_idx, pnMv0, which are used for the purpose of reference. It also stores DPB management parameters frame_num, long_term_pic_num, non_existing. The values of these DPB parameters can be changed during DPB management. A private copy is stored in a PictureHolder structure (320, 322) for some DPB management parameters if the parameters are needed for the decoding of the picture itself. For example, frame_used_for_reference, top_used_for_reference, . . . are the private copies of used_for_reference. The StorablePicture structure (340) also stores time stamp and display parameters (e.g., uiAspectRatio, bPicStructPresentFlag, timeStampFlag, bIsDiscontinuity) and parameters used for picture skipping (e.g., bSkipDecodingPicture, bIPicture, bBPicture).

A SliceHolder structure (330, 332) (stSliceHolder_tag) holds the temporary parameters, buffers and arrays for the decoding of one slice. Once the slice is decoded, the parameters in this structure can be de-allocated. For example, a SliceHolder structure (330, 332) stores slice parameters (e.g., start_mb_nr, iSliceType, current_slice_nr), buffers (e.g., pintraMBPosLevelBase, pcITransBuffers), and arrays (e.g., mvscale, listX, listXsize).

A macroblock structure (350) (macroblock_opt) holds the temporary parameters to decode one macroblock. A PictureHolder structure (320, 322) holds macroblock structures for the macroblocks inside a picture. In some implementations, the macroblock structure is highly compressed in that empty space in certain bytes is avoided by assigning different meanings to different bits within the bytes.

Alternatively, the decoder uses different data structures for multithreading. For example, the decoder uses data structures with other and/or additional parameters or data.

2. Code Paths.

In some embodiments, a multithreaded decoder uses different code paths for different picture formats. For example, an H.264 decoder includes different code paths for PROG pictures, PICAFF pictures, and MBAFF pictures. The following table shows different picture formats for different combinations of the parameters frame_mbs_only_flag, mb_adaptive_frame_field_flag and field_pic_flag for an H.264 decoder.

The PROG path processes pictures of format A, the PICAFF path processes pictures of format B or C, and the MBAFF path processes pictures of format D or E. The H.264 decoder also supports two different kinds of entropy encoding—CABAC and CAVLC. Since different picture formats often use different optimization techniques, the decoding process for different picture formats is separated into different code paths, i.e. PROG code path, PICAFF code path, and MBAFF code path. In each code path, entropy decoding can be CABAC or CAVLC.

Alternatively, the decoder uses more or fewer code paths.

3. Task Separation.

Figure 4:
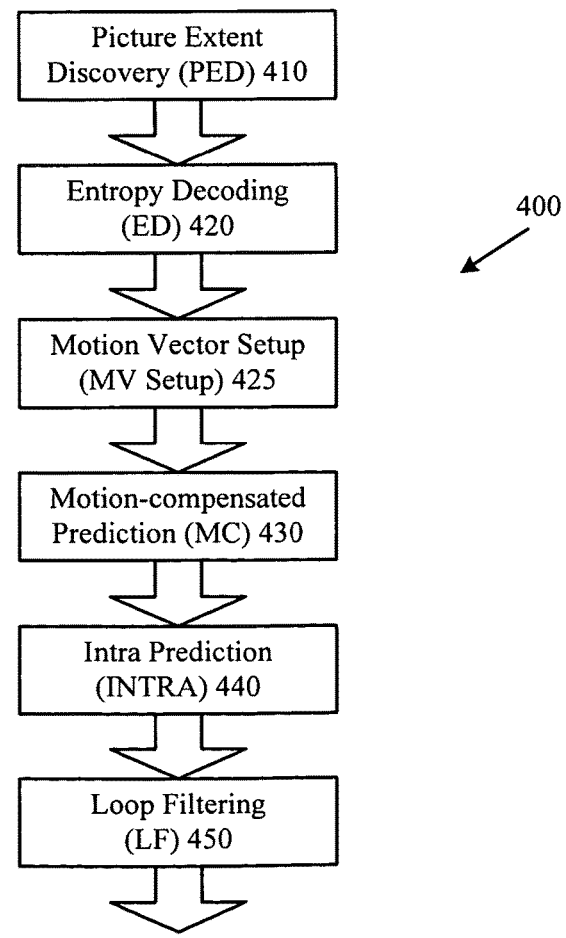
FIG. 4 is a diagram illustrating example stages of multithreaded decoding.

In some embodiments, a multithreaded decoder separates decoding processes into tasks as follows. FIG. 4 shows stages (400) of decoding for one picture in some implementations. The stages (400) include a picture extent discovery ("PED") stage (410) for finding and initializing complete pictures; an entropy decoder ("ED") stage (420) for entropy decoding transform coefficients, motion vectors and other side information with CABAC decoding or CAVLC decoding; a motion vector setup ("MV setup") stage (425) for reconstructing motion vectors in P/B or B pictures; a motion-compensated prediction ("MC") stage (430) for reconstructing inter-coded content using motion compensation; an intra-prediction ("INTRA") stage (440) for reconstructing intra-coded content using spatial intra prediction, and a loop filtering ("LF") stage (450) for performing deblock filtering and other processing on decoded pictures. Not all pictures are decoded with all stages. For example, the MC stage is not used for I pictures, and the INTRA stage is not used when decoding some P pictures.

Alternatively, the decoder partitions decoding processes into other and/or different stages, for example, by combining smaller tasks into larger ones. For example, for some architectures, the decoder puts decoding processes for MC, INTRA and LF into a single task. Or, a post-processing stage ("POST") is used for processing such as the addition of film grain noise to pictures before display.

4. Modules for Multithreading.

In some embodiments, a multithreaded decoder uses modules that facilitate multithreading by finding opportunities for fine-grained parallel processing. For example, for some implementations of H.264 decoders, aside from the modules conventionally used for decoding, these modules include a picture extent discovery module, a picture command queue management module, and a task scheduler.

The PED module finds a complete picture from the bit stream and initializes the parameters and data structures that will be used for decoding the picture. The PED module populates some of the initialized parameters and structures with parameters parsed from the bit stream. The PED

| frame_mbs_only_flag | mb_adaptive_frame_ffeld_flag | field_pic_flag | picture format |
|---|---|---|---|
| 1 | x | x | progressive (A) |
| 0 | 0 | 0 | progressive (B) |
| 0 | 0 | 1 | field picture(C) |
| 0 | 1 | 0 | mbaff frame(D) |
| 0 | 1 | 1 | field picture(E) | module also enters the initialized (but as yet un-decoded) picture into a live DPB, which facilitates multithreaded decoding.

The picture command queue module manages picture commands such as output commands and delete commands which are stored in a command queue (e.g., a FIFO queue). DPB management routines (e.g., in the PED module) produce picture commands associated with a dependent picture, which is an initialized but un-decoded picture in the DPB. When the dependent picture is decoded, the associated commands for the picture can be executed. The command queue thus records commands associated with completion of decoding for the dependent picture, and the commands are executed when the dependent picture is decoded, which facilitates simulation of a live DPB from a typical single threaded decoding scenario.

When a working thread is ready (out of waiting/sleep state), the task scheduler finds a ready task, runs the ready task with the working thread, updates the dependency graph on the completion of the task, puts ready tasks into a ready queue, and returns. To find the ready task, the scheduler can use a task dependency graph that facilitates fine-grained multithreading or some other threading model(s) dependent on the decoder settings.

Alternatively, a multithreaded decoder includes other and/or additional modules.

B. Picture Extent Discovery with Simulation of Live DPB.

Video decoding according to recent standards (e.g., H.264, VC-1) can be too computationally intensive for a single hardware thread. In particular, processes like CABAC and loop filtering can be performance bottlenecks.

In some embodiments, a decoder includes a PED module that parses encoded video bit streams to discover segments (e.g., groups of macroblocks, slices, pictures) that can be independently decoded. For example, the PED module finds picture boundaries and logs data in a lightweight look-ahead process, initializing parameters and data structures for pictures encountered in the bit stream, thereby providing a "snapshot" of upcoming segments and their dependencies that a task scheduler and DPB manager can use in multithreaded decoding. The look-ahead process is intrinsically serial, in that the decoder traverses the serial encoded video bit stream, but it results in the identification and organization of elements that can be decoded in parallel.

Figure 5:
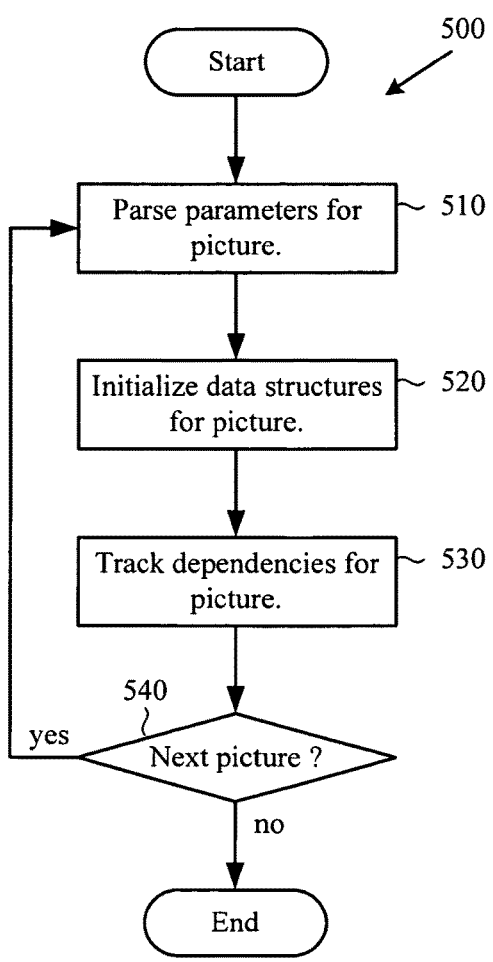
FIG. 5 is a flowchart illustrating a generalized technique for picture extent discovery in multithreaded decoding.

FIG. 5 shows a technique (500) for performing picture extent discovery. A decoder such as the one described above with reference to FIG. 2 or other decoder performs the technique (500).

For a given picture, the decoder (e.g., a PED module in the decoder) parses (510) parameters for the picture from the encoded video bit stream. For example, the decoder parses SPS, PPS, picture layer and slice layer parameters for the picture. Alternatively, the decoder parses other and/or additional parameters from the bit stream.

The decoder initializes (520) structures for holding parameters and data for the picture. For example, the decoder allocates memory and creates layered data structures for the picture as described above, including data structures for the picture, and one or more slices in the picture. The decoder can populate at least some of the data structures with parameters parsed from the bit stream. For other structures, the decoder just creates placeholders for later defined values—at the PED stage, it may suffice to determine which pictures are going to be decoded and determine what the values of certain parameters are, without referencing all pixel data. Alternatively, the decoder initializes other structures for the picture.

The decoder also tracks (530) dependencies for the picture. For example, the decoder identifies and logs stages of decoding for the picture that depend on the completion of other stages of decoding for the picture or that depend on the completion of stages of decoding for other pictures. The decoder tracks the dependencies, for example, in a task dependency graph that includes as nodes decoding tasks for segments of the picture and other pictures, and includes as edges the dependencies between tasks. Dependencies can be logged on a picture-by-picture basis, slice-by-slice basis, segment-by-segment basis, or other basis, for example, decided by the threading model. Alternatively, the decoder tracks dependencies using another type of tracking structure.

The decoder determines (540) whether to continue with the next picture or end. If the decoder continues, it parses (510) parameters for the next picture. For multithreaded decoding, the decoder typically scans ahead in the bit stream for multiple pictures before decoding begins for the scanned pictures. In this way, the decoder can more efficiently use available processing resources and make more informed task scheduling decisions. In some implementations, the decoder can have as many as 16 or 32 pictures "in flight" in various stages of decoding, before output of those pictures.

The timing and aggressiveness of PED depends on implementation. In some cases, a PED module when it executes tries to fill as many structures for pictures as possible, up to a limit set for the PED module. The PED is blocked if the PED outputs are full or there is no input available for scanning.

Standards such as the H.264 standard may specify rules for the behavior and state of the DPB, but typically do not detail how the DPB should be managed. In fact, the standards (and reference implementations) assume changes to the DPB on a picture-by-picture basis, with updates occurring in serial order.

In some embodiments, the decoder (e.g., the PED module) plays a role in DPB management for multithreaded decoding. The decoder emulates a "live" DPB that behaves as in the simple, single threaded situation. The decoder simulates decoding of pictures, which would potentially update the DPB, by entering initialized (but as yet un-decoded) pictures into the DPB. The decoder inputs commands in a picture command queue used to track completion of decoding tasks. A picture command in the queue associates a condition (e.g., decoding of a particular picture) with an action (e.g., output of a picture from the DPB, deletion of a picture from the DPB).

For example, the decoder populates the picture command queue during PED. The decoder puts one or more picture commands in a picture command queue. Each of the picture commands has an associated condition and an action. For example, the associated condition is completion of decoding of a particular picture (whether successful or not), and the action is to output or delete a picture from the DPB. An output picture is a picture to be displayed. When a picture is deleted, tables, parameters, and other structures for the picture are removed from memory.

Figure 6:
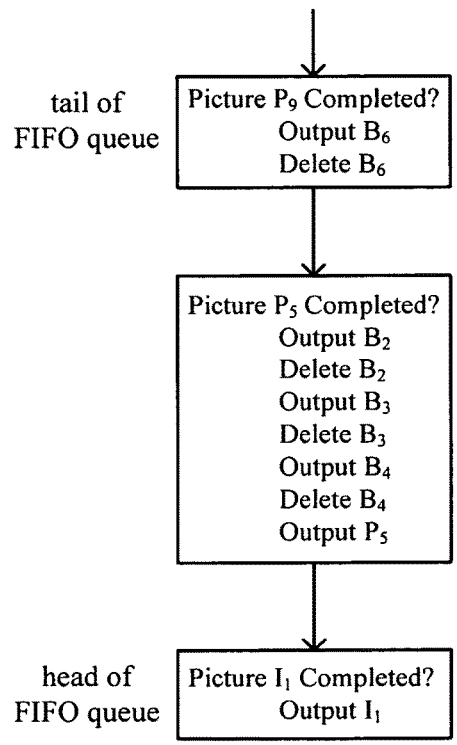
FIG. 6 is a diagram illustrating an example picture command queue in multithreaded decoding.

FIG. 6 shows an example FIFO picture command queue (600) that includes picture commands for the sequence of pictures having the display order $I_1, B_2, B_3, B_4, P_5, B_6, B_7, B_8, P_9 \ldots$ and having the coded order $I_1, B_2, B_3, B_4, P_5, B_6, P_9, B_7, B_8$, in the bit stream. I, P and B indicate I picture, P picture, and B picture, respectively, and the subscript indicates display order. As the decoder scans the bit stream during PED, the decoder adds picture commands starting at the head of the FIFO queue. According to the first command, when $I_1$ is decoded it can be output right away. When decoding completes for $B_2$, $B_3$ and $B_4$, there are no output commands or delete commands. The next commands put in the FIFO queue relate to the completion of decoding for $P_5$. When decoding of $P_5$ completes, the decoder can output and delete $B_2$, $B_3$ and $B_4$ from the DPB, and it can output $P_5$ from the DPB. The next commands in the FIFO queue relate to the completion of decoding for $P_9$. When decoding of $P_9$ completes, the decoder can output and delete $B_6$ from the DPB.

Alternatively, the decoder uses a different data structure to track picture commands. For example, a node of the queue corresponds to a condition (e.g., completion of decoding of a particular picture) and the node stores a single action to be performed upon satisfaction of the condition (e.g., output one picture or delete one picture). With this structure, the queue (600) shown in FIG. 6 would have 10 nodes, one for each action. A node for $I_1$ would have one output action associated with it, and seven nodes for $P_5$ would have seven actions associated with them, respectively. Or, the decoder uses queue nodes with other and/or different fields.

C. Managing Picture Command Queue.

In some embodiments, the decoder uses a picture command queue to record and execute picture commands in decoding order. The picture command queue facilitates complex DPB management in multithreaded decoding, with efficient use of memory and correct output of decoded pictures, even though decoding may occur in parallel and finish for pictures in an order different than the coded bit stream order.

In conventional single threaded decoding, the decoder timing is to traverse the bit stream for a picture, decode the picture, then put the picture in the DPB for output. When a decoded picture enters the DPB, depending on the parameters in the input picture, DPB management routines decide which picture(s) to output and which picture(s) to delete from the current DPB. The DPB is effectively a black box with input and output only. When the decoded picture enters the DPB as input, the management routines can produce two types of commands: output picture(s) and delete picture(s).

For example, when the input decoded picture is an instantaneous data refresh ("IDR") picture, all the pictures in the current DPB are output and deleted. Or, according to reference implementations of the H.264 standard, when the MMCO parameter is equal to 5 for the input decoded picture, all the pictures in the current DPB are output and deleted. Generally, if the decoder uses a "bumping" scheme for picture output, the not-yet-output picture with smallest value of PicOrderCnt( ) is output from the current DPB if the DPB is already full, and any already output picture(s) marked as not_used_for_reference are deleted from the current DPB. The "output" and "delete" commands in the picture command queue for multithreaded decoding have similar meanings, but the commands also have conditions (e.g., decoding of particular pictures) associated with them.

In multithreaded decoding, pictures are not necessarily decoded in the coded order they appear in the bit stream. Pictures later in coded order might actually be decoded first. Simply entering decoded pictures into the DPB in the order of their actual decoding can cause problems when the pictures are not entered in coded order, for example, due to execution of DPB commands like output and delete in the wrong order.

So, in some embodiments, a decoder simulates the behavior of a live DPB with decoded pictures in it by entering initialized pictures in the DPB, where the initialized pictures are not necessarily decoded. The decoder (e.g., as part of PED) scans ahead in the bit stream, considering certain picture parameters for pictures but not sample data or side information such as motion vector information or reference picture identifier information for the pictures. The decoder allocates memory and creates data structures for a picture, perhaps populating the picture with certain parameters, then enters the initialized picture into the DPB in its correct, coded order. Thus, the decoder finds complete pictures, which are initialized with parameters but not decoded, and enters them in the DPB. Typically, an initialized picture has its picture header and slice header parameters correctly decoded from the bit stream as part of PED but sample data and side information are not yet decoded.

The decoder can also record picture commands associated with the future completion of decoding of an initialized picture. The decoder records the commands, for example, in a FIFO queue such as the queue (600) shown in FIG. 6. The decoder executes the commands in the queue when the conditions (here, the completion of decoding for the initialized pictures) associated with the commands have been completed. The commands thus execute in correct order (as set during PED) but the execution of the picture commands may be blocked at times to wait for decoding to complete.

FIG. 7 shows a generalized technique (700) for removing picture commands from a picture command queue in multithreaded decoding. A decoder such as the one described above with reference to FIG. 2 or other decoder performs the technique (700).

The decoder decodes (710) a picture then checks (720) a queue for picture commands that can be executed. The decoder determines (730) whether a command is ready (e.g., if the condition for the command at the head of the queue has been satisfied) and, if so, removes (740) the command from the queue, executes (750) the command, and checks/determines (720, 730) whether another command is ready.

FIG. 8 shows a diagram illustrating how picture command queue management processing is embedded in different decoding tasks in an example implementation. A working thread for a PED task (810) finds (812) a completed picture, enters (814) an initialized version into the DPB, and records (816) the picture and one or more commands dependent on decoding of the picture in a FIFO queue. A command in the FIFO queue thus has a dependent picture, which is the input picture to DPB associated with it. In this implementation, a dependent picture occupies one entry in the picture command FIFO queue and has one or more actions associated with it (e.g., a set of output commands and a set of delete commands).

A working thread for the LF task (850) performs deblocking (852) as the last part of decoding for a picture and determines (854) whether there are any picture commands in the FIFO queue whose condition is completion of decoding for the just decoded picture. If so, the working thread for the LF task (850) executes (856) the command(s). Thus, when a thread finishes the decoding for a dependent picture, any commands associated with the dependent picture in the FIFO queue can be executed. The commands are executed in FIFO order. If decoding has not finished for a previous dependent picture represented in the FIFO queue, the commands for a current dependent picture are not executed, even if decoding has already finished for the current dependent picture.

Commands are put in the FIFO queue in the order pictures have in the bit stream, regardless of the threading model. Although the command ordering is serial, decoding can be in parallel for multithreaded decoding. As a result, picture command execution can be blocked at a particular point in the FIFO queue, pending completion of decoding of a dependent picture at that point.

In addition to recording output and delete commands associated with the completion of decoding for pictures, the command queue can store other types of commands. For example, in some implementations, the command queue also stores commands associated with changes in SPS or PPS. When a SPS or PPS changes, the associated action can be, for example, table re-initialization for tables used in decoding, pool re-allocation for memory, or commands on a parameter set map/database. In general, the commands are put in the FIFO queue in the serial order that the coded video bit stream provides for the commands. The decoder (e.g., PED module) puts the commands in the FIFO queue without executing the commands or waiting for completion of the conditions. The commands are later executed, for example, during multithreaded decoding, when the conditions are satisfied.

D. Organizing and Scheduling Tasks.

In some embodiments, a decoder organizes tasks using a task dependency graph and schedules execution of the tasks in multithreaded decoding.

1. Building Task Dependency Graphs.

To build the graph, the decoder analyzes dependencies between past and current pictures. The decoder performs this analysis, for example, during PED. The decoder notes dependencies between stages of decoding for the pictures. In general, a stage of decoding is a set of operations or steps performed to decode a picture or part of a picture, for example, PED, ED, MC, INTRA, LF or POST. In some implementations, the decoder logs dependencies between segments, where a segment is a group of macroblocks for part of a slice, for a slice, for parts of multiple slices, for multiple slices, or for a picture. Thus, picture-by-picture dependencies and slice-by-slice dependencies are special cases of segment-by-segment dependencies.

Within a picture, ED (including CABAC) is typically parallelizable from slice to slice, which facilitates multithreaded decoding. A slice is not split into multiple segments for ED, but a segment may include multiple slices for ED. After ED, there may be inter-picture dependencies for operations such as MC, which relies on previously decoded reference pictures. Typically, macroblocks can be segmented in arbitrary ways for MC stages. For LF, a segment typically includes one slice. Overall, the segmentation decision for macroblocks in a picture can be the same from stage-to-stage of decoding, or the segmentation decisions can vary from stage-to-stage.

FIG. 9 shows a generalized technique (900) for creating a task dependency graph for segments of macroblocks. A decoder such as the one described above with reference to FIG. 2 or other decoder performs the technique (900).

The decoder identifies (910) dependencies for segments. For example, the decoder identifies the dependencies for segments of a picture during a lightweight scan through the coded video bit stream as part of PED. Alternatively, the decoder identifies dependencies using a different scanning mechanism.

The decoder then organizes (920) the one or more segments, regardless of slice boundaries. For example, within a picture, the decoder groups intra-coded macroblocks together in a segment. In another picture, the decoder groups motion-compensated macroblocks that use the same reference picture together as one segment, and the decoder groups motion-compensated macroblocks that use a different reference picture together as a second segment.

The decoder then assimilates (930) tasks for the segment(s) into a task dependency graph. For example, the decoder builds a task dependency graph such as the one shown in FIG. 10 for picture-by-picture dependencies. Or, the decoder builds a task dependency graph with tasks for slices (or, more generally, segments) for nodes. In building the task dependency graph, the decoder consider dependencies between different stages for the same segment (e.g., INTRA depends on ED, MC depends on ED, LF depends on MC, LF depends on INTRA) and dependencies between stages for different segments (e.g., INTRA for segment 2 may depend on INTRA for segment 1 in the same picture, MC for segment 3 may depend on LF for segment in another picture). Dependencies can be intra-picture dependencies or inter-picture dependencies.

The decoder determines (940) whether to continue with the next picture and, if so, identifies dependencies for the next picture.

2. Example Task Dependency Graphs.

Figure 10:
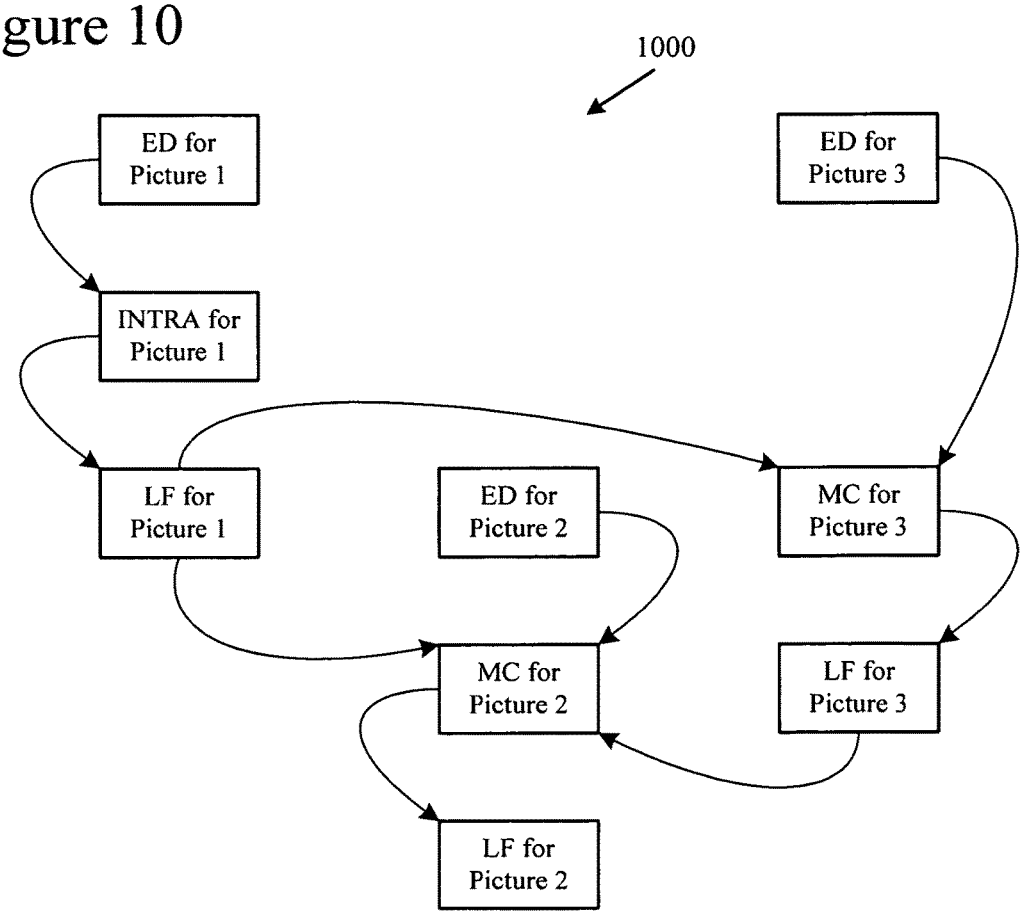
FIG. 10 is a diagram illustrating an example task dependency graph for pictures.

FIG. 10 shows an example task dependency graph (1000) for pictures 1, 2 and 3. Picture 1 is an I picture, and picture 3 is a P picture with macroblocks that use picture 1 as a reference picture. Picture 2 is a B picture with macroblocks that use picture 1 and picture 3 as reference pictures. The INTRA task for picture 1 depends on completion of the ED task for picture 1, and the LF task for picture 1 depends on completion of the INTRA tasks for that picture. The MC task for picture 3 depends on completion of the LF task for (reference) picture 1 and the ED task for picture 3. The LF task for picture 3 depends on completion of the MC task for the picture. For picture 2, the MC task depends on completion of three other tasks—the ED task for picture 2 and the LF tasks for pictures 1 and 3. The LF task for picture 3 depends on completion of the MC task for picture 3. Alternatively, the graph (1000) also includes a MV setup task for picture 2, which depends on completion of the MC task for picture 3, and upon which the MC task for picture 2 is dependent.

In some implementations, graph nodes represent segments. If a picture has 8000 macroblocks, the macroblocks might be organized as four segments for parallelization in multithreaded decoding. If decoding is split into 6 stages (e.g., PED, ED, INTRA, MC, LF and POST) and there are 15-20 pictures in flight at various stages of decoding, the task dependency graph can easily include hundreds of nodes, which facilitates fine-grained scheduling of multithreaded decoding.

In some implementations, the task dependency graph is organized as a set of nodes. A node structure has a counter that indicates how many task dependencies the node's task has. The counter is incremented (or decremented) when a task dependency is added (or completed/removed). For example, a node structure for the MC for Picture 2 task of FIG. 10 would have a counter=3, then the counter would be decremented as the LF for picture 1, ED for picture 2 and LF for picture 3 tasks complete. A node structure also has an expandable list of its dependencies. For example, the node structure for the MC for Picture 2 task of FIG. 10 has one dependency in its list—LF for picture 2. Dependencies are added to the list when noted during PED. When a task completes, the task(s) dependent on the completion are notified, with counter(s) for those task(s) being decremented. For example, when the MC for Picture 2 task of FIG. 10 completes, the counter for the node structure for the LF for picture 2 task is decremented. When the dependency counter is zero for a task during decoding, the task is put in the ready task list for scheduling. Alternatively, the node structure for tasks in the task dependency graph includes other and/or additional fields.

3. Scheduling Tasks.

The decoder then schedules tasks for decoding using the task dependency graph. In implementations in which the graph nodes include dependency counters, the decoder adds a task to a list of ready tasks when the dependency counter for the task reaches zero. During multithreaded decoding, the decoder selects tasks from the ready list according to one or more heuristic approaches. For example, the heuristic approach is:
  (a) FIFO—tasks are scheduled in the order they were put in the ready list;
  (b) stage priority—tasks are scheduled depending on priority for their decoding stage;
  (c) picture age—tasks for oldest pictures have highest priority;
  (d) number of dependencies on tasks—task with most dependencies on it executes first, such that completion of the task potentially unblocks more other tasks in the graph; or
  (e) shortest critical path from task to output—tasks that put pictures close to output are executed first.
Alternatively, the task scheduler considers other and/or additional heuristics.

E. Error Detection Mechanisms

In some implementations, a decoder handles errors differently depending on at which decoding stage the error is identified.

1. NALU Parsing

Figure 11:
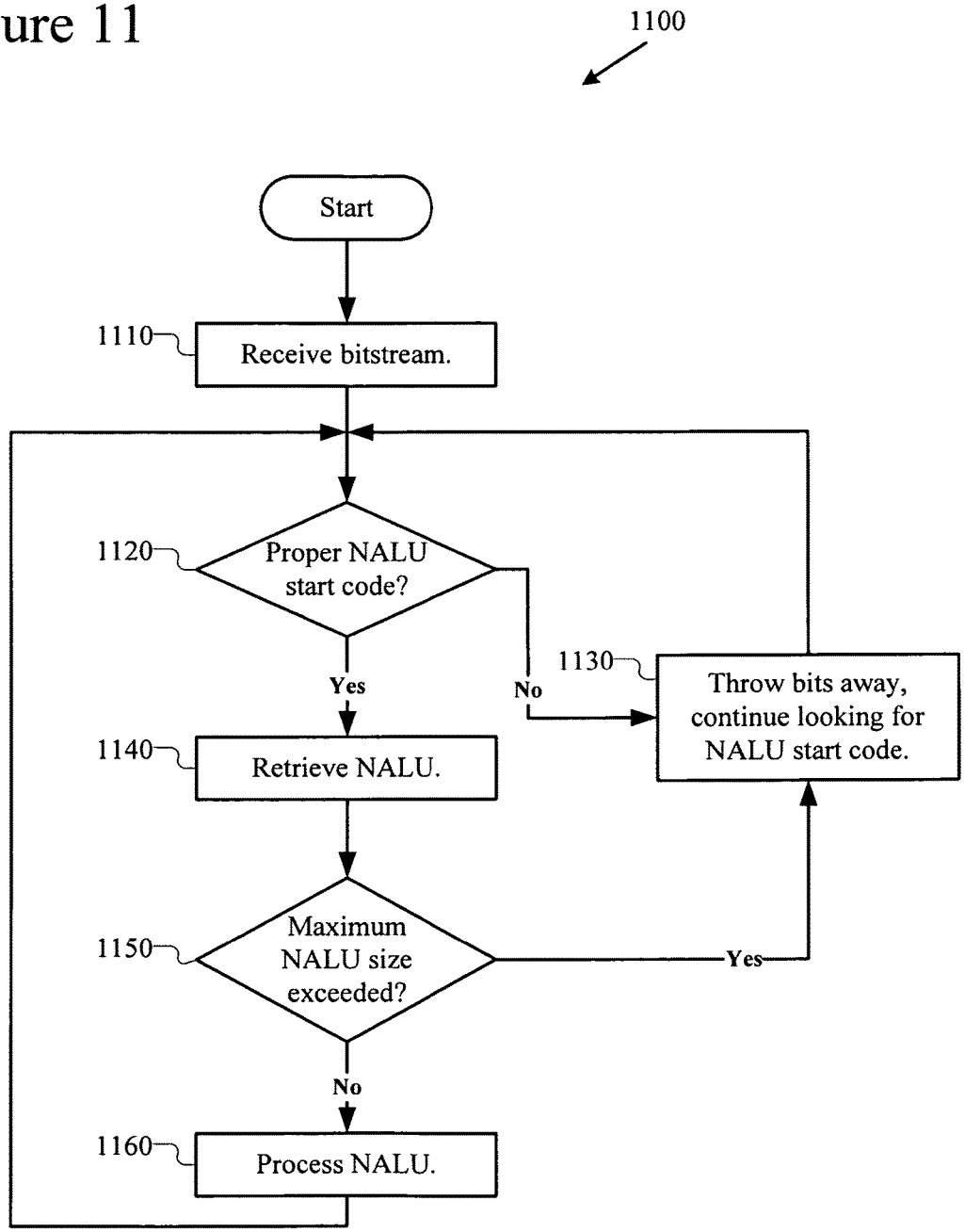
FIGS. 11-18 are flowchart illustrating generalized techniques for detecting errors in video decoding.

FIG. 11 shows a technique (1100) for detecting and handling errors identified during NALU parsing operations of video decoding. A decoder such as the one described above with reference to FIG. 2 or other decoder performs the technique (1100). In the technique (100), the handling of the error depends on a decoder reviewing NALUs as they are encountered during decoding.

The process begins when the decoder receives a bit stream (1110) and continues as the decoder encounters bits serially in the bit stream. In one decoder implementation, when bits are fed into a H.264/AVC decoder, the decoder attempts to identify a complete NALU. A complete NALU is all the bytes between two start codes with prefixes "0x 00 00 01". Thus, the decoder reviews the bit stream (starting at the beginning or at an arbitrary location within the bit stream where decoding begins) to find a proper NALU start code (1120). If a proper start code is not found at the beginning, the decoder may have started decoding at an arbitrary position in a bit stream or tried to decode a corrupted bit stream. In this case, the decoder (using, for example, a NALU parser) will skip/throw away the junk bits in the beginning of a video stream (1130). The decoder may still assume that the bit stream does contain valid data, however, and thus returns to continue the process, treating bits as valid data (but throwing them away) until it finds a start code.

If a NALU is found that starts with a proper start code (1120), then the decoder retrieves the NALU (1140). Next, since, in each profile, the size of NALU is constrained by a maximum size, the decoder determines if the NALU has exceeded the maximum size for the NALU (1150). When the NALU parser detects the size of current NALU has exceeded the maximum size, it will discard all the bits for the NALU and start to find the beginning of a NALU again (1130). If the NALU does not exceed the maximum size, the decoder continues to process the retrieved NALU (1160). This process (1100) facilitates a NALU parser that can retrieve NALUs starting from an arbitrary position in a video bit stream, and prevent later stages of a decoder from receiving invalid NALUs.

2. PED Error Detection

Not all errors can be found through NALU parsing, however. In various implementations, when the decoder catches the error during a PED stage, the decoder processes the error by cleaning up the picture in question (and skipping decoding of the picture) or just skipping decoding of the picture, depending on the type of error and progress through PED processing. If the error is detected during another stage, the decoder processes the error using another error handling mechanism such as skipping decoding of the affected part (e.g., slice) but decoding other parts, or concealing the error in the affected part.

Figure 12:
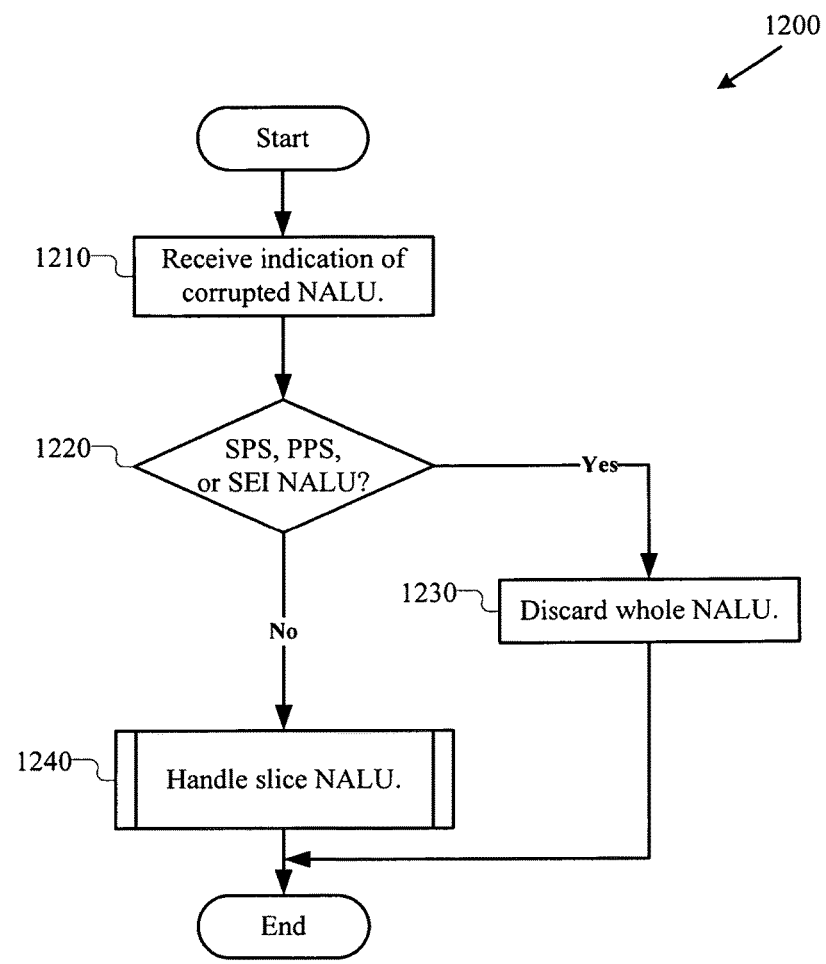

Thus, FIG. 12 shows a technique (1200) for handling a corrupted NALU identified during decoding. A decoder such as the one described above with reference to FIG. 2 or other decoder performs the technique (1200). The decoder handles different kinds of errors differently. In the technique (1200), the handling of the error depends on several factors, including when the error is detected and what type of error is found.

The technique begins by receiving an indication that a NALU is corrupted (1210). This may occur, for example, because the PED task itself determines an error, such as a syntax error in the NALU, or because an upstream module (e.g., from transport or network layer processing) discovers and informs the parser that there is an error for the NALU.

For H.264 decoding, there are four kinds of main NALUs retrieved by the NALU parser of the decoder, i.e., SPS, PPS, SEI and slice NALUs. In one implementation, all data in SPS, PPS and SEI NALUs are parsed in a PED task, and the PED task checks for errors when it verifies the syntax correctness of syntax elements in the bit stream. If a corrupted NALU is an SPS, PPS, or SEI NALU (1220), as detected through an error in syntax verifications, the PED task will discard all the syntax elements from that NALU, i.e. the whole NALU (1230). Independently, an upstream module (e.g., from transport or network layer processing) can indicate an error, such as packet loss or bit-flip, in a SPS, PPS or SEI NALU. If the corrupted SPS, PPS or SEI NALU is detected through an upstream indication, the PED task can even skip parsing of the NALU. The PED task can then continue to find a complete picture. If, however, the decoder determines (1220) the NALU to be a slice NALU, the decoder handles the slice NALU according to additional factors. One technique (1300) for handling corrupted slice NALUs is described below.

Figure 13:
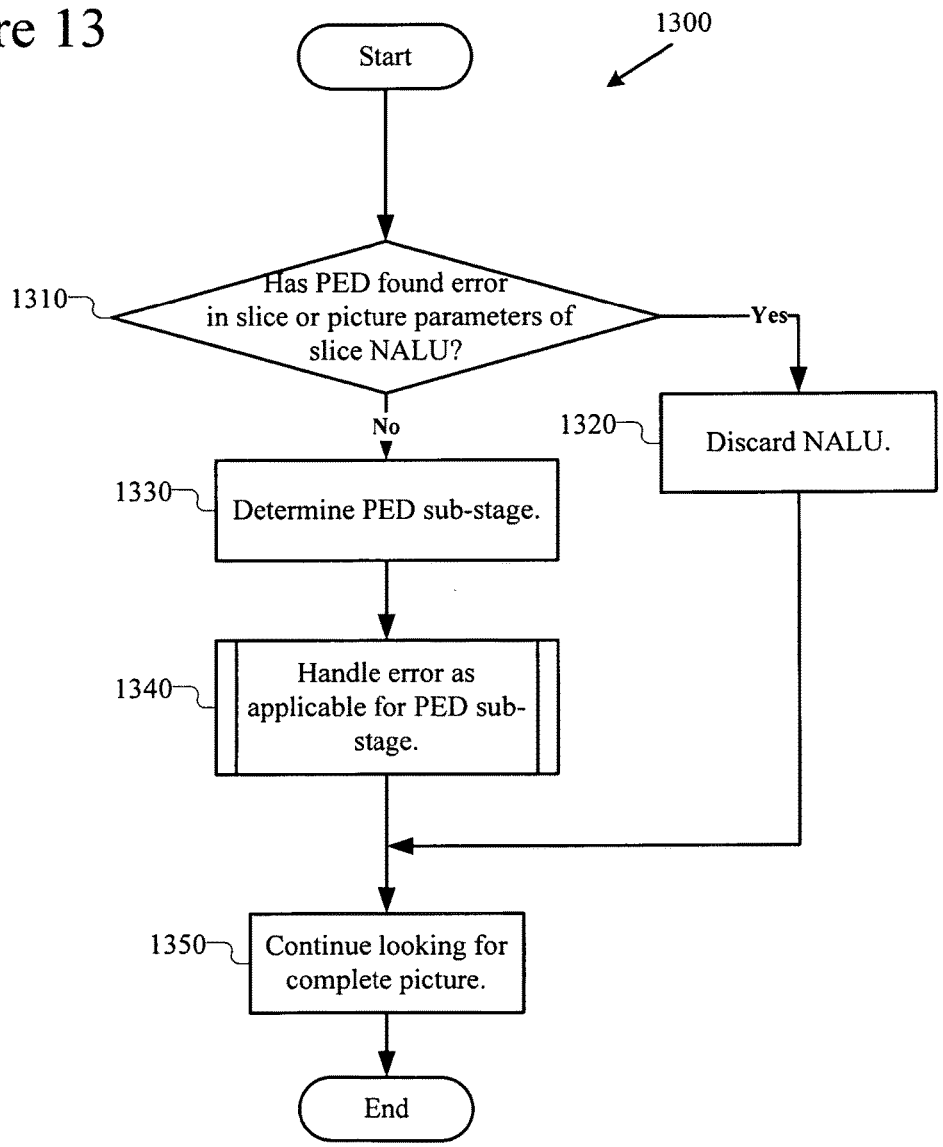
Figure 14:
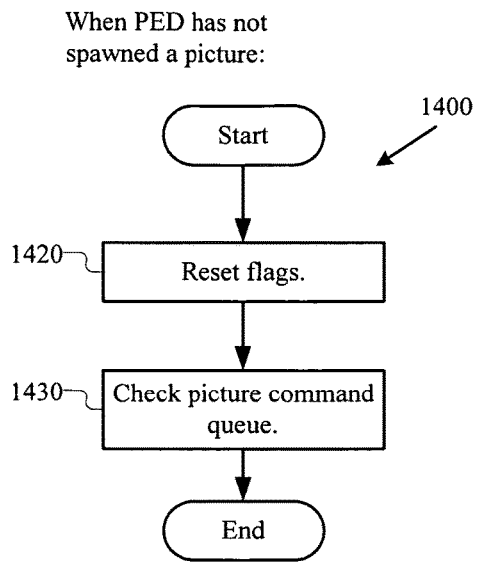
Figure 15:
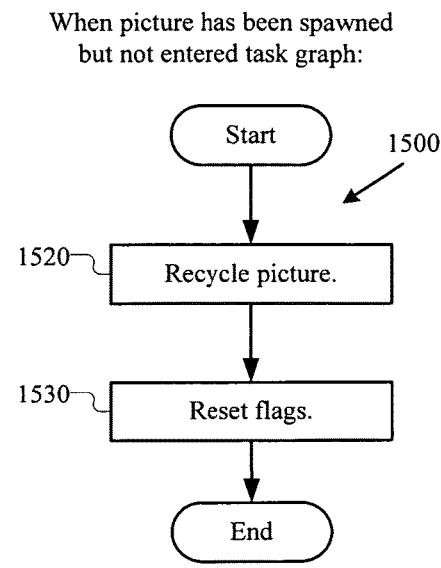
Figure 16:
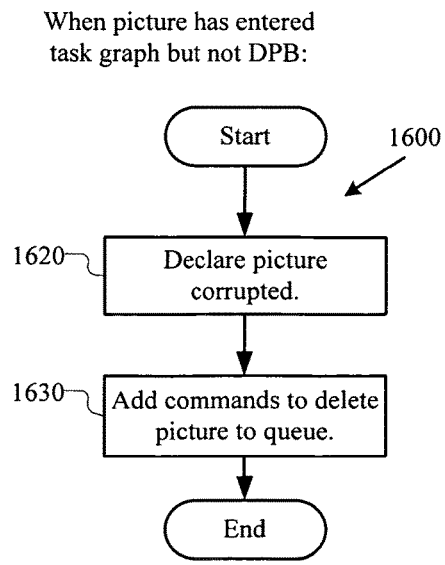
Figure 17:
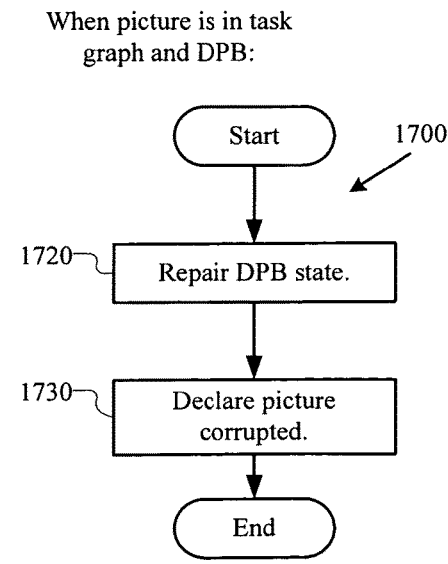

FIG. 13 shows a technique (1300) for PED handling of a corrupted slice NALU identified during decoding. A decoder such as the one described above with reference to FIG. 2 or other decoder performs the technique (1300). The decoder handles kinds of errors differently at different sub-stages of PED processing.

In the technique (1300), the handling of the error depends on several factors, including when the error is detected and what type of error is found. When decoding a slice NALU, the PED task decodes the slice parameters from a slice NALU and picture parameters applicable for the slice NALU and puts them into structures for the slice and the corresponding picture. When an error has been detected, if the PED task finds the error in the slice or picture parameters for a slice NALU (1310), the PED task discards (1320) the whole slice NALU and continues looking for a complete picture (1350).

Otherwise, if the detected error was not detected in early parsing of slice parameters or applicable picture parameters, the PED task will process the error in one of four different ways according to in what PED sub-stage the error was detected. Thus, the PED task determines which PED sub-stage the picture associated with the slice NALU is in (1330) and then modifies error handling tasks depending on the particular sub-stage (1340). Particular techniques that vary depending on PED sub-stage are described below with reference to FIGS. 14-17. After dealing with the error, the decoder continues to look for a picture (1350). In one implementation, the decoder continues until it finds a valid, error-free picture, reaches the end of the encoded video bit stream, or encounters a fatal error.

FIGS. 14-17 show techniques (1400-1700) for PED handling of a corrupted slice NALU identified during decoding, depending on the PED sub-stage the picture associated with the slice NALU has reached in decoding. A decoder such as the one described above with reference to FIG. 2 or other decoder performs one or more of the techniques (1400-1700). The decoder handles different kinds of errors differently. In the techniques (1400-1700), the handling of the error depends on several factors, including when the error is detected and what type of error is found. After each of the techniques (1400-1700), the PED task continues to look for a complete picture after performing the error handling techniques.

If the error is detected when PED has not yet spawned a picture (e.g., the PED task has not initialized structures for the picture and its slices), the PED task resets decoding flags that were set to control decoding for the slice NALU (1420) or NALUs in the picture and checks a picture command queue (1430) for any commands that can be executed.

Otherwise, if the error is detected before the picture in PED enters the task graph or other structure for task scheduling purposes (e.g., the PED task has initialized structures for the picture and/or its slices, and at least partially populated such structures), the decoder recycles the picture (1510) and resets flags for the picture (1520) that were set to control decoding for the slice NALU(s) in the picture.

Otherwise, if the error is detected after one or more tasks for the picture have entered the task graph (or other structure for task scheduling purposes) but the picture has not entered in the DPB, the decoder declares the picture as corrupted (1620). This means, in one implementation, that the picture formally goes through the decoding process, but at each decoding task, no actual decoding work is performed. For example, this is accomplished by setting a flag for the picture indicating its corruption, or by marking the corrupted picture as skipped by setting a flag bSkipDecodingPicture=TRUE. This may cause, for example, display of a picture at the correct time for the corrupted picture by repeating the display of another picture. Next, since the picture is not in DPB, the decoder records commands of picture deletion (1630) to the command queue.

Otherwise, if the error is detected after tasks for the picture have entered the task graph (or other structure for task scheduling purposes) and the picture has been added to the live DPB, the PED task of the decoder attempts to repair DPB state (1720) and declares the picture as corrupted (1730).

3. ED Error Detection

Figure 18:
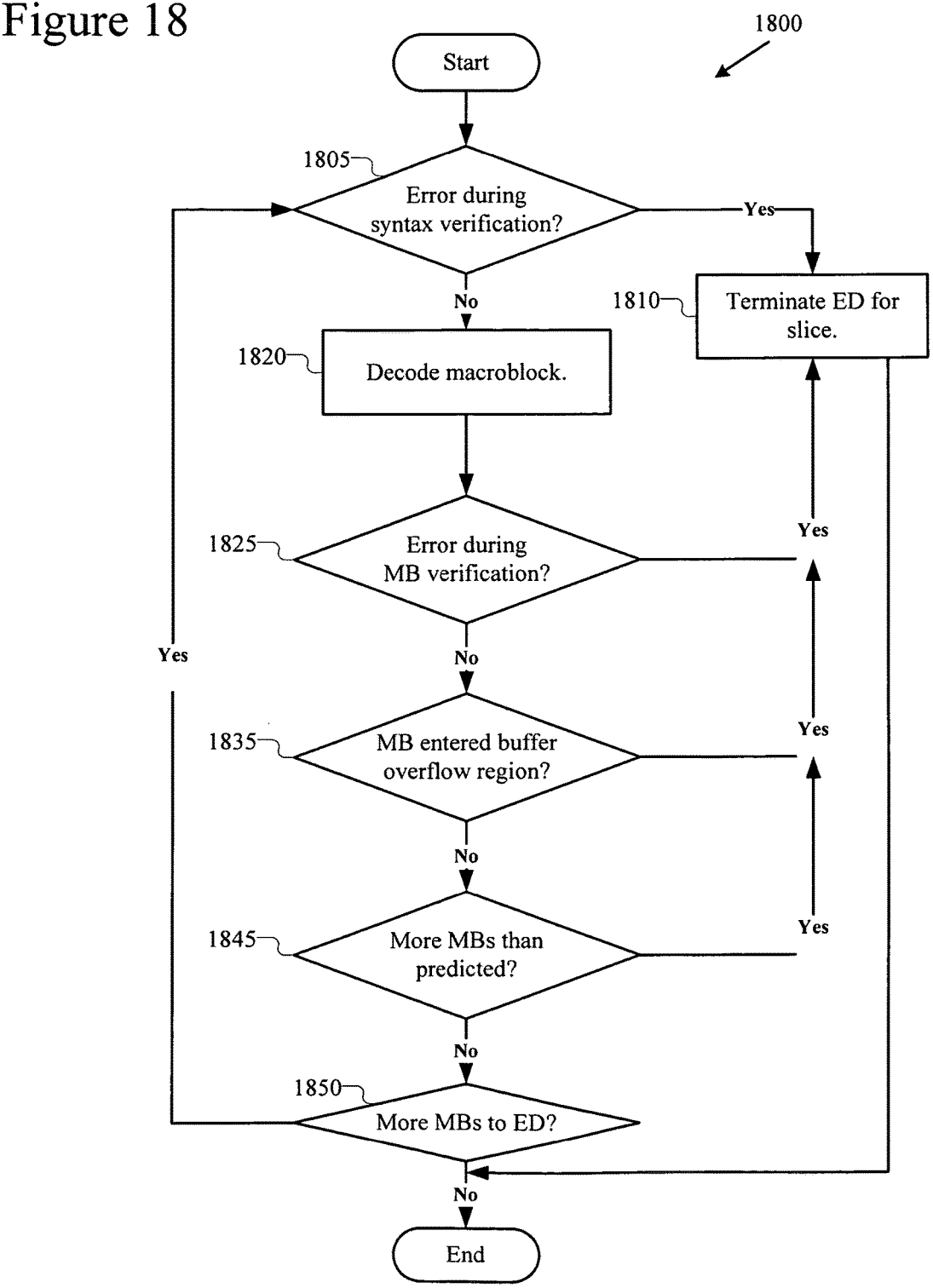

FIG. 18 shows a technique (1800) for ED detection of errors when decoding MBs of a slice. A decoder such as the one described above with reference to FIG. 2 or other decoder performs the technique (1800). The decoder handles different kinds of errors differently. In the technique (1800), the handling of the error depends on several factors, including what type of error is found.

In addition to picture parameters, ED tasks decode side information for the macroblocks of a slice, such as macroblock type and partition, motion vector(s) and reference index(indices), as well as residual data for the sub-blocks and blocks of macroblocks in the slice. As such, many syntax verifications are done in ED. Thus, using the technique (1800), whenever an error is detected by the ED task during syntax verification for entropy coded syntax elements of the next macroblock in the slice, (1805) the decoder terminates ED (1810), at least for that MB.

Next, the decoder entropy decodes the various syntax elements of the macroblock (1820). Then, the decoder verifies the decoded syntax elements of the macroblock to check whether entropy decoding is valid or not after each MB's decoding (1825). This MB-level checking is more efficient than checking inside the hot entropy decoding routines (e.g., CABAC routines), since such bit-level error checking can unacceptably harm performance. In some implementations, this design decision saves an error check cost of more than 100 times and can achieve the same degree of error detection as in bit-level entropy decoding error checking. If the decoder detects an error here, it terminates ED (1810). For example, the decoder can terminate ED for the entire slice containing the MB with the error, or can terminate just for that MB.

Additionally, the buffers used in entropy decoding can have additional redundancy, by adding buffer overflow regions. This is used by the decoder to guard against buffer overflows during ED (e.g., to make sure those buffers will not be read across the boundary when there are some errors in an MB's entropy decoding). Thus, the decoder, after decoding the MB, checks to determine if the decoded MB entered the overflow space (1835). If the decoder detects an overflow here, the MB can be assumed to be corrupted and the decoder terminates ED (1810)). For example, the decoder can terminate ED for the entire slice containing the MB with the error, or can terminate just for that MB.

Finally, the ED task will record how many macroblocks are decoded. Additionally, PED can estimate the number of macroblocks in a slice when it finds all the slices in a picture. This number will match the number of decoded macroblocks in the ED task if all the slices are perfect. Thus, if the decoder determines the number of decoded macroblocks in the ED task to be larger than the estimated number of macroblocks in the slice (1845), the slice is assumed corrupted and ED terminates (1810). On the other hand, after completion of ED for the macroblocks of the slice, if the number of decoded macroblocks in the ED task is less than the estimated number of macroblocks in the slice, the hole or missing macroblocks will be concealed as stated below. The decoder continues (1850) entropy decoding macroblocks of the slice, serially or in parallel, until entropy decoding is completed for the macroblocks in the slice or entropy decoding terminates early for the slice.

4. Error Detection in Other Stages

It may also be noted that, in various implementations, if an MC or INTRA tasks finds an error during the decoding process, it marks only that MB as corrupted but continues decoding for other MBs in a slice until the end of the slice. Moreover, whenever an error is detected in a picture, the deblocking of that whole picture can be disabled, or deblocking can be enabled for good slices only, to avoid deblocking across boundaries of corrupted macroblocks.

F. Error Recovery Mechanisms

In some applications, a decoder, such as the one described above with reference to FIG. 2, needs to start playback in some arbitrary position of a video bit stream. This situation can arise, for example, upon user indication to seek and play at a specified position in a file or stream, upon a chapter switch in HD-DVD, or upon a channel switch in satellite/internet video streaming. In other situations, an error may cause playback to begin in an arbitrary position. Various implementations of the decoder utilize different modes to start decoding for channel start up or seeking.

Figure 19:
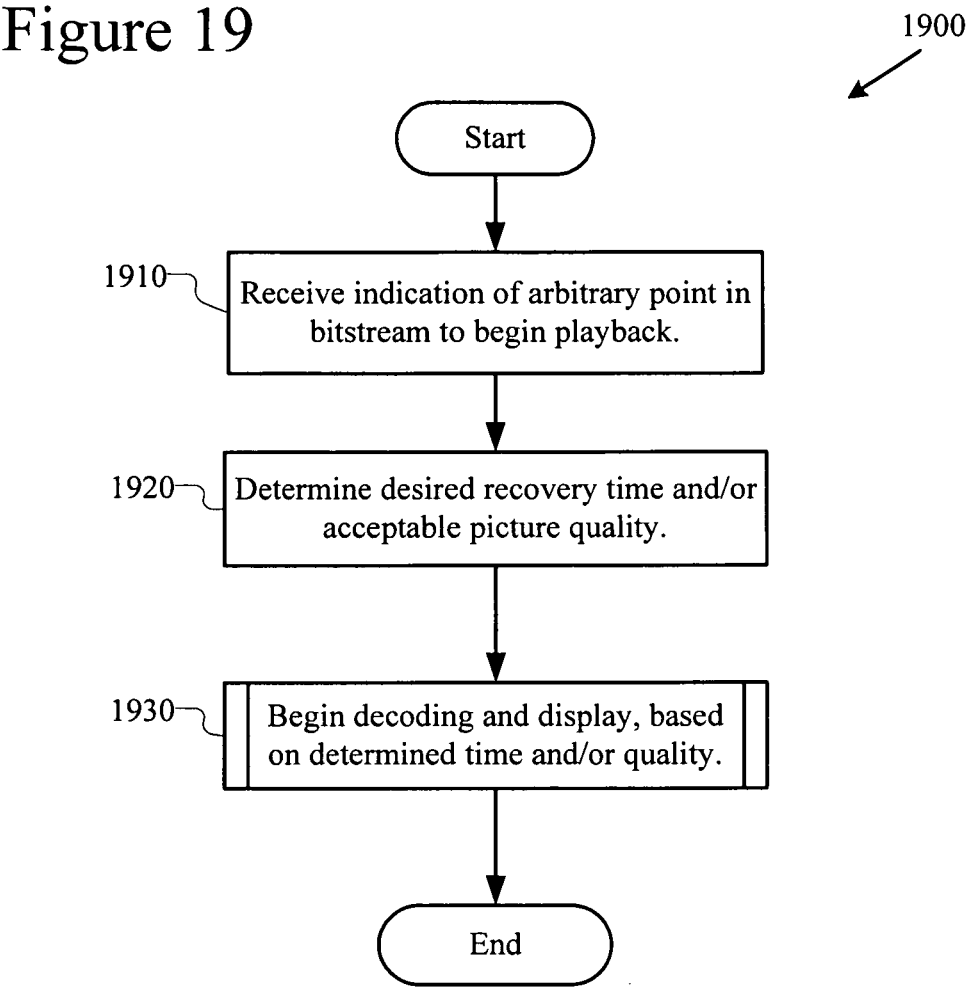

FIG. 19 shows a technique (1900) for beginning playback at an arbitrary position. A decoder such as the one described above with reference to FIG. 2 or other decoder performs the technique (1900). The decoder handles different kinds of error recovery differently. In the technique (1900), the handling of the error recovery depends on several factors, including acceptable delay in beginning display and/or desired video quality.

The technique begins when the decoder receives an indication of an arbitrary point in a video bit stream to begin playback (1910). The decoder determines desired recovery time and/or acceptable picture quality (1920). In some implementations, this determination may be performed ahead of time and preset before the decoder receives a bit stream to decode or encounters errors. For example, the determination may depend on the use scenario such as Internet streaming or satellite channel switching. In other implementations, the decoder may determine the desired recovery time and/or acceptable picture quality at the time of playback. This determination may be based upon, in various implementations, decoding statistics, quality feedback, and/or user preferences. Then, the decoder begins decoding and display based on the determined time and/or quality (1930).

FIGS. 20-22 show techniques (2000-2200) for beginning playback at an arbitrary position based on determined desired time and/or quality aspects. A decoder such as the one described above with reference to FIG. 2 or other decoder performs one or more of the techniques (2000-2200). The decoder handles different kinds of error recovery differently, as the techniques illustrate. In the techniques (2000-2200), the handling of the error depends on several factors, including acceptable delay in beginning display and/or desired video quality, as mentioned above. While low delay and high quality are both, in general, desirable, the decoder may need to favor one over the other in some circumstances; each illustrated technique is directed toward a different time delay and quality tradeoff. Alternatively, the decoder performs other and/or different error recovery techniques with other delay/quality tradeoffs.

The technique (2000) shown in FIG. 20 is utilized when few corruptions are desired (i.e., high quality is desired) and a long delay can be tolerated. Such a mode is employed, for example, in a handheld media player for which delays of 5, 10 or more seconds are acceptable. In this mode, the decoder seeks (2020) to an I picture (such as the first I picture) when starting at the arbitrary position, such as in channel start up or file seeking. The decoder then begins (2030) normal decoding at the first I picture it encounters. Although there may be a long delay before the first I picture is encountered, picture quality will typically be very good since dependencies on missing reference pictures will be rare or non-existent.

The technique (2100) shown in FIG. 21 is used when medium delay is acceptable (but long delay is not), and poor initial quality is acceptable, if needed. Such a mode is employed, for example, when fast channel switch (with low delay) is desired but not required and corruptions in pictures are acceptable (i.e., lower quality is acceptable). In this mode, the decoder attempts to seek to an I or P picture. The decoder does this by looking for an I picture within a threshold number N of the first pictures after the arbitrary starting position (2120). In various implementations, for example, N may be 16 or 32. If an I picture is found (2130) within the threshold number of pictures, then the I picture is used to begin decoding (2140). If, however, there is no I picture in the first N pictures (2130) after the starting position, then the decoder starts decoding from the first I or P picture after the N picture threshold (2150).

The technique (2200) shown in FIG. 22 is used when low delay is desired, even if providing low delay results in poor initial quality. Such a mode is employed when fast channel switch (with low delay) is required, even if some corruptions in pictures result. Decoders for digital video delivered by satellite might use this mode, for example. In this mode, the decoder starts decoding immediately with the first picture after the arbitrary position (2220). However, since this can result in unacceptably corrupted video, the decoder delays displaying the pictures until quality is at an acceptable level. For example, in one implementation, if the starting picture is an I picture, display begins immediately. If the first picture decoded is a P or B picture, while decoding starts immediately, display is delayed by the decoder for several pictures since the picture quality may be quite bad initially. Depending on implementation, the display may begin after a predetermined number of pictures, or may begin when the decoder determines during playback that the quality has reached a particular level.

In some implementations of the techniques described herein, the decoder treats any recovery picture as if it is an I picture, even if it is encoded as a P or B picture. Recovery pictures are valid starting points for channel start up or file seeking according to standards such as H.264. In implementations for certain video acceleration platforms, if decoding starts from a P picture, the first P picture is modified to be an I picture with black or some other color of samples. For example, the decoder modifies the picture to have all-IPCM macroblocks of that color, in order to avoid referencing potentially non-existing pictures during motion compensation for the macroblocks. This implementation decision helps avoid crashes in those implementations for video acceleration platforms.

An IDR picture is a valid starting point for decoding—the pictures after an IDR picture do not reference pictures before the IDR picture for motion compensation. An IDR picture typically begins a video sequence, but IDR pictures may be rare after that. For some applications, IDR pictures appear only once per chapter of video or only once every 30 seconds in a sequence. When trying to start decoding from an arbitrary location in the bit stream, there might not be an IDR picture for several seconds or even minutes. As a result, while waiting for an IDR picture, downloaded bits may be wasted or reasonable quality pictures may be skipped.

When a decoder starts decoding from a non-IDR picture, the non-IDR picture (if a P or B picture) or subsequent coded pictures may reference pictures that are missing from the DPB. Thus, when the decoder starts decoding from a non-IDR picture, it simulates DPB state, as if it had started decoding from an actual IDR picture, in order to have correct reference picture relationships in the process of picture decoding. For example, for H.264 decoding, the simulation of DPB state is done using a routine "fill_frame_num_gap( )" to place one or more dummy pictures in the DPB. The pictures used for "fill_frame_num_gap( )" have their own parameters different from each other. However, they share the same piece of dummy memory for pixel data with black values. Hence, if a picture being decoded uses one of the pictures simulated through "fill_frame_num_gap( )" as a reference picture, the decoder can perform the picture reconstruction but reconstruct those areas as black motion-compensation predicted blocks.

In a H.2642 SPS, the flag "gaps_in_frame_num_value_allowed_flag" may be 0; this means a gap in frame_num values is not supposed to be allowed during picture decoding. However, in some error recovery implementations, the H.264 decoder detects and fills gaps in frame_num as if this flag had a value of 1. Because the decoder tries to fill frame_num gaps in a way that is not specified by the H.264/AVC standard, it is possible for DPB management to exhibit some errors. Such errors can include, for example, the number of reference pictures exceeding the maximum number allowed by SPS, or the DPB not being able to find a picture to output. When such errors are detected, the decoder ignores the errors on purpose in order to speed error recovery.

G. Error Concealment Mechanisms

A picture consists of one or more slices. It might have missing slices, i.e., the slices might not cover the whole picture. A slice might be decoded partially by an ED task. Or a slice NALU may be marked as truncated, for example, when the decoder receives information from upstream modules (e.g., for transport layer or network layer processing) that report events such as packet loss, bit-flips or CRC errors. In these cases not all MBs can be decoded. Those MBs which are not decoded may have junk content; this can result in low visual quality in the picture. In some embodiments, a decoder will conceal those macroblocks that are not decoded with different schemes in different platforms.

1. Choosing a Suitable Neighbor Picture for Concealment

In an H.264/AVC decoder, in the decoding processes for a current picture, only the pictures in DPB are available to access for the current picture. In some error concealment implementations, from the pictures in the DPB, the decoder chooses the picture with the closest picture order count ("POC") (or the most suitable picture with a close POC) to the current picture as a suitable neighbor picture for concealment.

Figure 23:
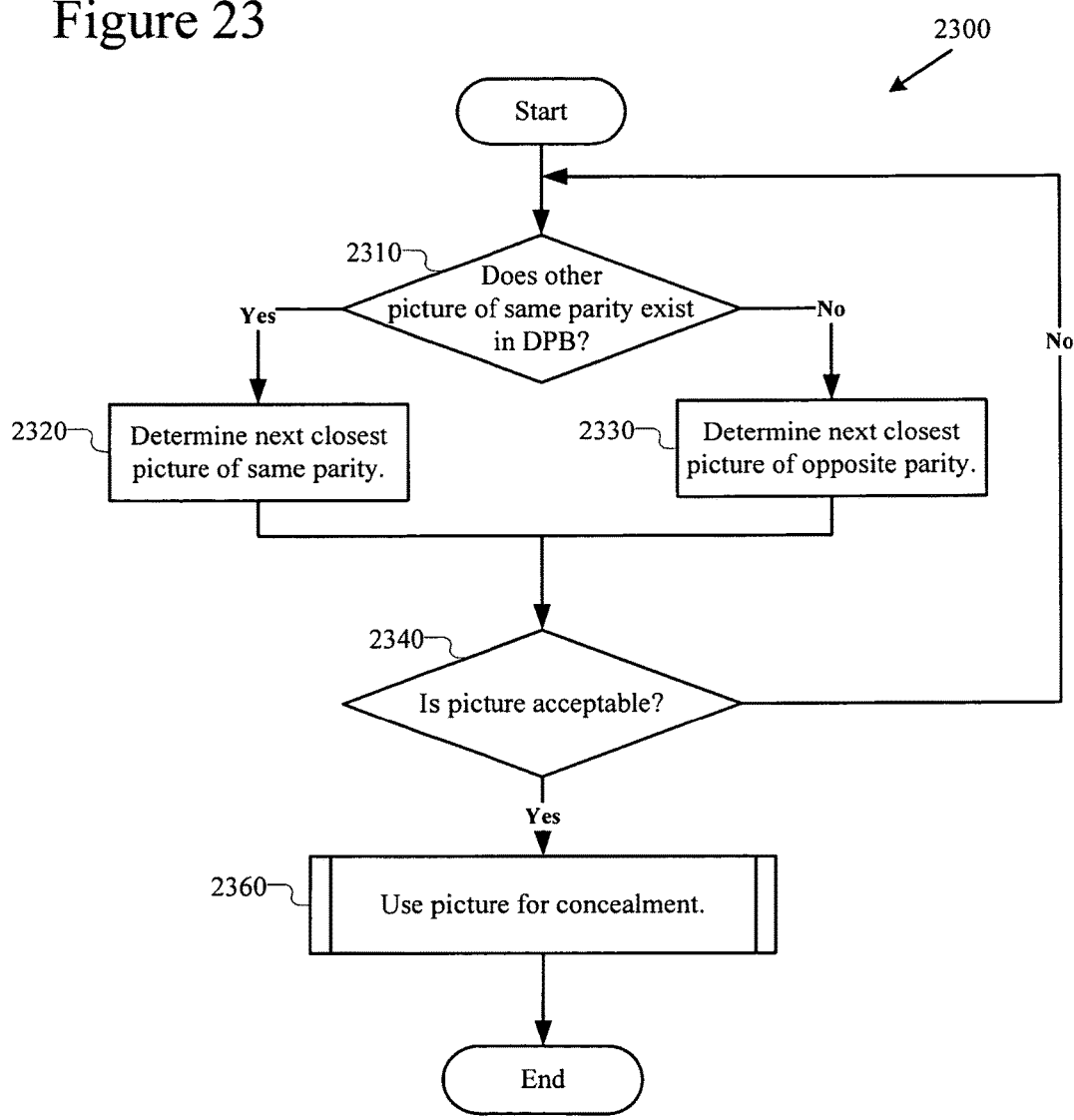
FIG. 23-30 are flowcharts illustrating generalized techniques for concealing errors in video decoding.

FIG. 23 shows a technique (2300) for beginning playback at an arbitrary position in a bit stream. A decoder such as the one described above with reference to FIG. 2 or other decoder performs the technique (2300). The decoder handles different kinds of error concealment differently. In the technique (2300), the handling of the error depends on several factors, including the hardware implementation the error concealment is performed on and/or frequency of errors in the bit stream.

To find the nearest suitable neighbor picture for a current picture, the decoder first searches the pictures with the same parity in the DPB (2310), starting from the same-parity picture with the closest POC and moving to same-parity pictures with increasingly different POCs as needed. If such a picture is found, the next picture in POC with the same parity is chosen (2320). If no other picture with the same parity is found, then the decoder picks the closest picture with a different parity (2330), starting from the opposite-parity picture with the closest POC and moving to opposite-parity pictures with increasingly different POCs as needed.

Next, the decoder accounts for the condition that, in conjunction with quality feedback, various pictures in the DPB may skip their decoding. Such pictures typically lack meaningful visual information, and thus will not be available for concealment. The decoder determines if the previously-chosen picture (2340) is acceptable (e.g., was not skipped, has acceptable level of quality, lacks significant corruption, is not too far from the current picture, etc.). In some implementations, it is undesirable to use a picture too far away from the current picture for concealment. If no acceptably close picture can be found, the decoder instead sets the corrupted areas black or some other color(s), instead of using concealment from what might be a very different picture. For example, the decoder uses one or more thresholds to limit the distance between the nearest suitable neighbor and current picture. In alternative implementations, the decoder can also choose several candidates for the picture used for concealment and evaluate how corrupted they are, since they may also contain errors themselves. Then the decoder can choose a suitable compromise between smaller time (or POC) distance and less corruption.

Returning to FIG. 23, if the selected nearest neighbor picture is not acceptable, the decoder searches for the next closest suitable neighbor picture (2310, 2320, 2330). If the selected picture is acceptable, then the picture is used for concealment (2360) as needed. Various implementations of concealment techniques, using nearest suitable neighbor pictures in different ways, are described below.

In some implementations that use PED, the selection of this nearest suitable neighbor picture happens in PED, when PED finds a complete picture, no matter whether the picture contains errors/corruptions or not. This information identifying the nearest suitable neighbor picture may be held in case errors or corruptions are later discovered in the complete picture that was processed in PED. Alternatively, nearest suitable neighbor pictures are identified as needed in later decoding tasks. Note that if the pictures are not field pictures, but rather frame pictures, the nearest neighbor may be chosen without reference to field parity.

2 Error Concealment in Software Multithreaded Decoding Implementations

In multithreaded software decoding implementations, at some point in a task dependency graph or other task dependency data structure (for example, when all the slice NALUs in a picture have been decoded by ED task(s)), it is known whether there are any corruptions in the picture. If there are corruptions, they can typically be concealed using corresponding areas from the nearest suitable neighbor, selected, for example, as described with reference to FIG. 23. The concealment can be accomplished through "copy" operations with zero motion from collocated areas of the nearest suitable neighbor picture. Or, the concealment can be accomplished through motion-compensated "copy" operations from collocated areas of the nearest suitable neighbor picture, using global motion or predicted motion in motion compensation for corrupted blocks or macroblocks of the current picture.

The nearest neighbor needs to be available for concealment with the nearest neighbor to be used, however. Hence, in a multithreaded decoder, this creates additional dependencies between decoding tasks of the current picture and nearest suitable neighbor picture. For example, the decoder may need to wait for the completion of the nearest suitable neighbor, if the neighbor is not null, when the neighbor is used for concealment of current picture.

Figure 24:
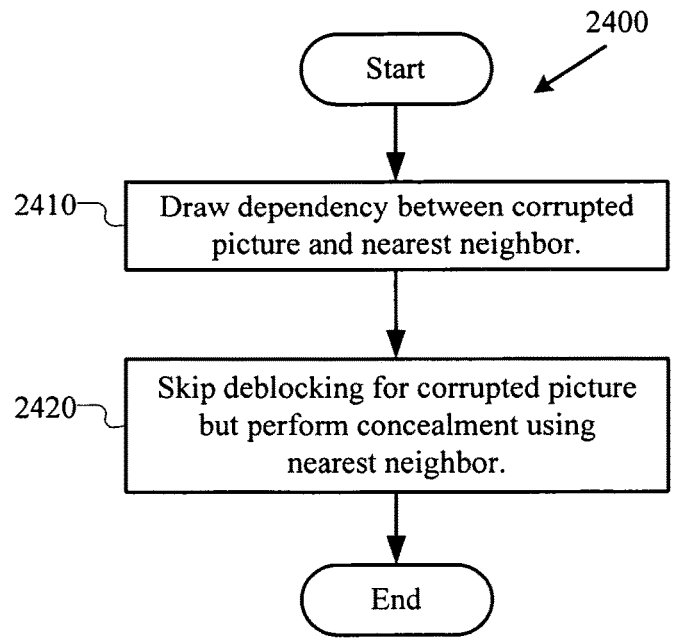

FIG. 24 shows a technique (2400) for using a nearest suitable neighbor for concealment in multithreaded software decoding. A decoder such as the one described above with reference to FIG. 2 or other decoder performs the technique (2400). On discovery of corruption within a current picture, the decoder draws a dynamic dependency edge from a final task of the nearest suitable neighbor to a task of the current picture (2410) in the task dependency graph or other task dependency data structure. For example, the decoder draws a dependency edge from the deblocking (LF) task of the nearest suitable neighbor to the deblocking (LF) task of the current picture. (This is done since completion of the deblock LF task indicates the nearest suitable neighbor is available for use in error concealment, and since error concealment happens right inside the deblock (LF) task of current picture.)

Later, when there are corruptions in the current picture, the decoder performs concealment (2420) using the nearest suitable neighbor picture. For example, deblocking is skipped and the decoder performs concealment using zero-motion copy operations or motion-compensated copy operations (with global motion or predicted motion) from the nearest suitable neighbor picture.

In software decoding implementations for which PED identifies nearest suitable neighbor pictures, the decoder identifies and retains the nearest neighbor for concealment no matter what kind of picture the current one is: I, P or B picture. The decoder retains the nearest suitable neighbor in its DPB, even if the neighbor picture would otherwise have been deleted, as long as another picture is dependent on it for concealment.

3. Error Concealment for Decoding Implementations that Use Acceleration for MC and Inverse Transforms In typical decoding implementations that use video acceleration for motion compensation and inverse frequency transforms (but not for entropy decoding), entropy decoding tasks are still performed in CPU. As such, when a picture is fed into video acceleration modules, the decoder typically has determined from the results of entropy decoding whether there are any corruptions in the picture. If there are corrupted macroblocks and the decoder plans to use error concealment from a nearest suitable neighbor picture, the decoder modifies the reference picture list(s) and/or parameters of corrupted macroblocks (e.g., reference indices, motion vectors, macroblock types). In addition to feeding this information to the video acceleration modules, if the reference list lacks the nearest suitable neighbor, the decoder feeds values for the nearest suitable neighbor picture so it will be available for concealment.

Figure 25:
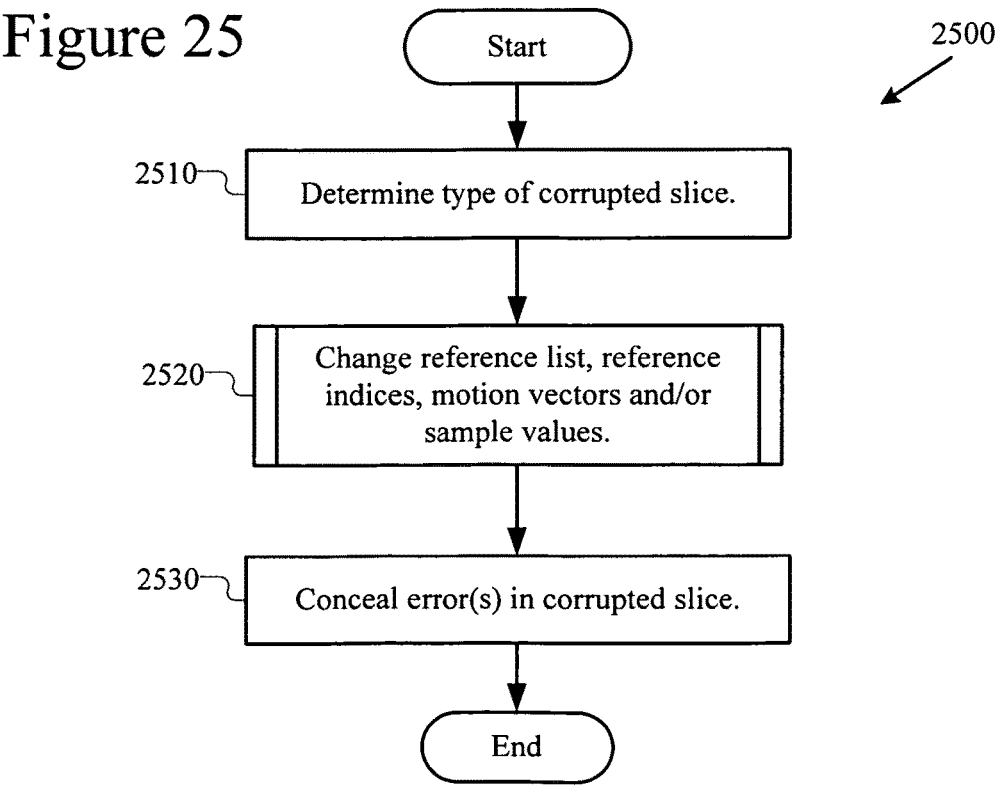

FIG. 25 shows a technique (2500) for using a nearest suitable neighbor for concealment in decoding implementations that use video acceleration for motion compensation and inverse frequency transforms (but not for entropy decoding). A decoder such as the one described above with reference to FIG. 2 or other decoder performs the technique (2500).

In the technique (2500), the handling of the error depends on several factors, including the type of slice for which concealment is to be performed. The decoder first determines the type of the corrupted slice (e.g. I, P or B) (2510). Next, the decoder changes the reference list to be used by the video acceleration modules based on the type of slice (2520). The decoder can also change (2520) reference indices, motion vectors, macroblock types, sample values and/or other parameters of corrupted macroblocks in the slice. Particular example techniques for performing such modifications are described below.

Later, as needed during decoding and reconstruction, the decoder performs error concealment by performing regular decoding processes on the modified information fed to the video acceleration modules.

Figure 26:
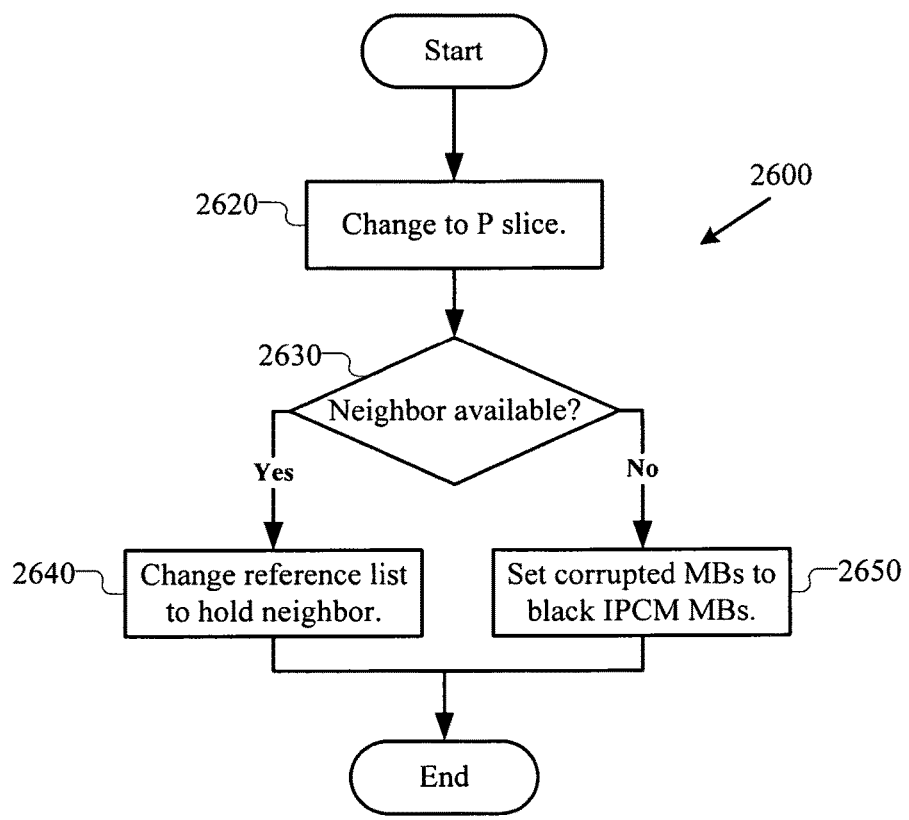
Figure 27:
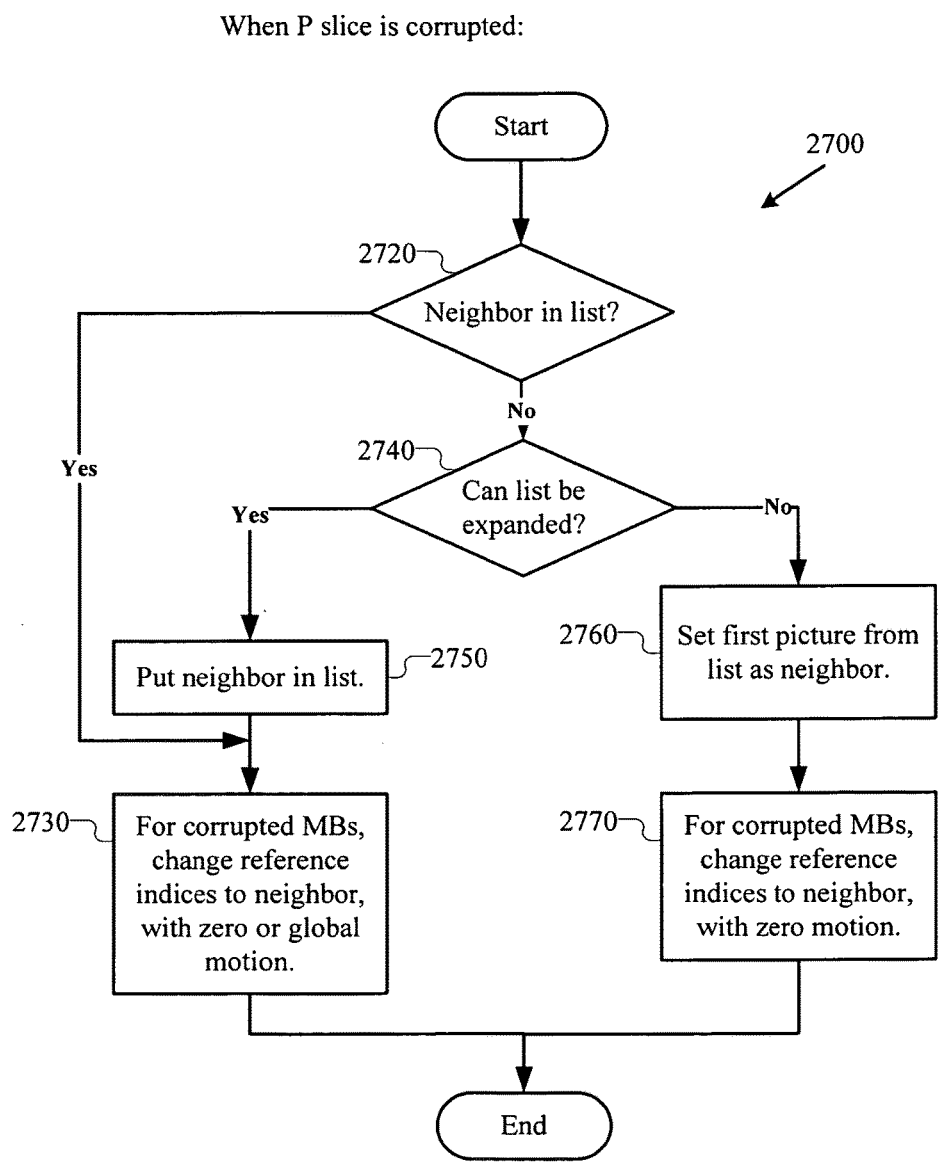
Figure 28:
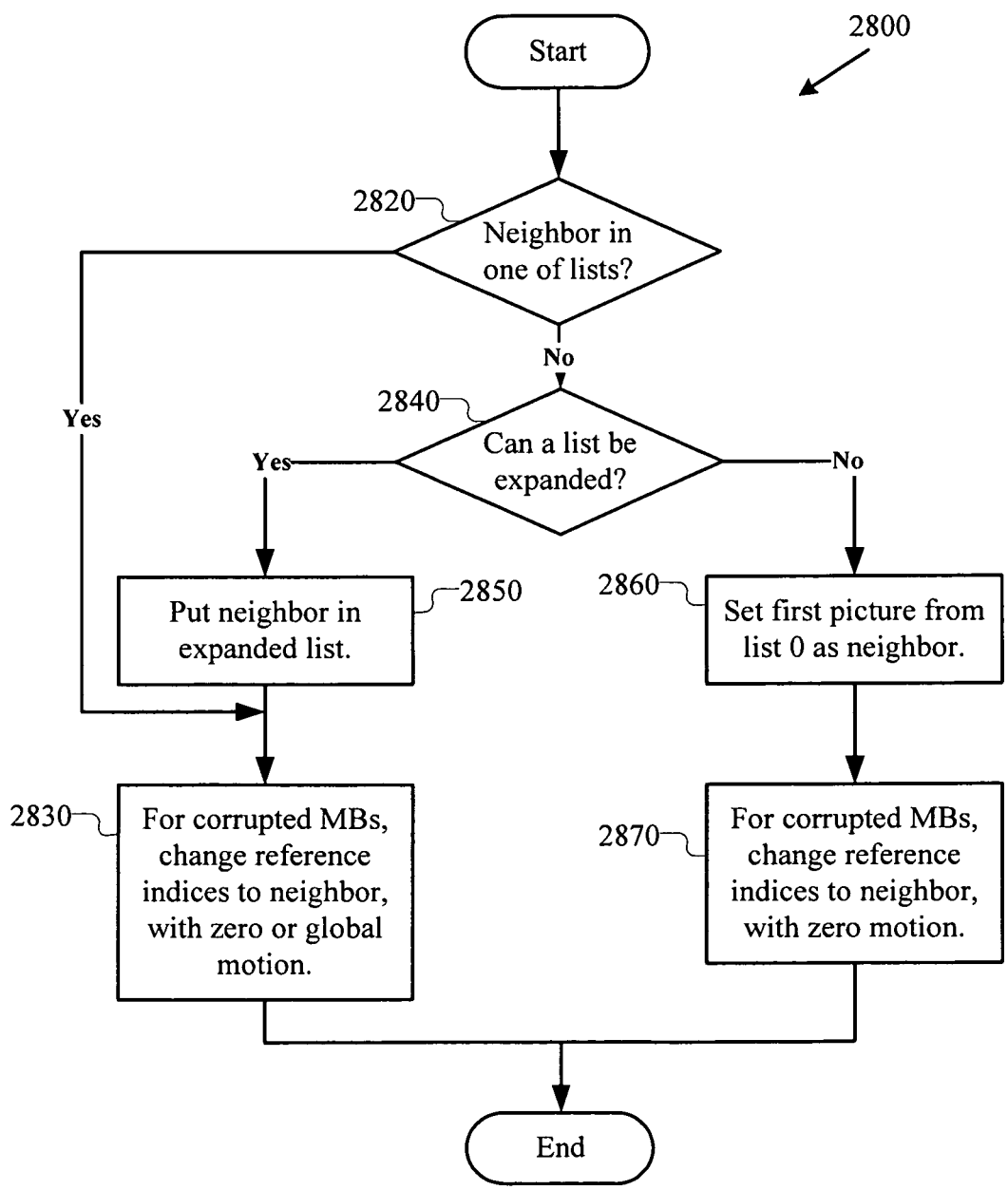

FIGS. 26-28 show techniques (2600-2800) for using a nearest suitable neighbor for concealment in decoding implementations that use video acceleration for motion compensation and inverse frequency transforms (but not for entropy decoding). A decoder such as the one described above with reference to FIG. 2 or other decoder performs one or more of the techniques (2600-2800). The decoder handles different kinds of error concealment differently, depending on the type of slice for which concealment is to be performed.

The technique (2600) shown in FIG. 26 is utilized when the current corrupted slice is an I slice. In this case, the decoder changes the slice to be a P slice (2620). Next, the decoder determines if a suitable neighbor can be found in the DPB (2630). If there is a nearest suitable neighbor, the decoder changes the reference list to hold the nearest neighbor for this slice (2640), which is now a P slice. The decoder can also change macroblocks of the slice (now a P slice) to implement zero-motion copy operations relative to the nearest suitable neighbor in the reference list. Otherwise, the decoder sets the corrupted macroblocks in the slice to IPCM macroblocks (2650) with black sample values or other sample values.

The technique (2700) shown in FIG. 27 is utilized when the current corrupted slice is a P slice. The decoder first looks for the nearest suitable neighbor in the P slice's list of reference pictures (2720). If the nearest neighbor is inside the list, the decoder makes changes to reference indices and motion vectors for corrupted macroblocks in the P slice such that the corrupted macroblocks reference that chosen nearest suitable neighbor picture and have zero motion (or some global or predicted motion) (2730). If the nearest suitable neighbor is not inside the list of reference pictures, the decoder attempts to expand the list if possible (2740). This may not be possible, however, if the list has a size constraint. If it is possible, the decoder puts the nearest suitable neighbor picture in the list (2750), conveying buffer management instructions or values for the nearest suitable neighbor picture as needed. The decoder then makes the corrupted macroblocks reference that chosen nearest suitable neighbor picture and have zero motion (or some global or predicted motion) (2740). If the decoder cannot put the nearest neighbor into the list of reference pictures (e.g., due to a constraint on the list size), the decoder uses the first picture from its list as the nearest suitable neighbor (2760) and modifies (2770) corrupted macroblocks in the P slice to reference the modified nearest neighbor and use zero motion in motion compensation.

The technique (2800) shown in FIG. 28 is utilized when the current corrupted slice is a B slice. The decoder first look for the nearest suitable neighbor the B slice's two reference picture lists (2820). If the nearest neighbor is inside one of the two lists of reference pictures, the decoder makes changes to reference indices and motion vectors for corrupted macroblocks in the B slice such that the corrupted macroblocks reference that chosen nearest suitable neighbor picture in the list and have zero motion (or some global or predicted motion) (2830). If the nearest suitable neighbor is not inside one of the two lists, the decoder attempts to expand one of the two lists if possible (2840). If this is possible, the decoder puts (2850) the nearest suitable neighbor picture in one of the two lists, conveying buffer management instructions or values for the nearest suitable neighbor picture as needed. The decoder makes (2830) the corrupted macroblocks in the B slice reference that chosen picture in the list and have zero motion (or some global or predicted motion). If the decoder cannot put the nearest neighbor picture into one of the two lists (e.g., due to a constraint on the list size), the decoder uses the first reference picture from the B slice's list 0 as the nearest suitable neighbor (2860). The decoder modifies (2870) corrupted macroblocks in the B slice to reference the modified nearest neighbor and use zero motion in motion compensation.

Compared to the multithreaded software decoding concealment discussed above, error concealment in decoding implementations with video acceleration may sometimes have to use a different picture as the nearest suitable neighbor (e.g., due to the constraints of list sizes), which can adversely affect the quality of the error concealment. In typical decoding scenarios, however, this is uncommon. As such, error concealment quality here is similar as that in multithreading software decoding. When decoding implementations with video acceleration perform picture decoding in a serial order (e.g. one picture after the other), no additional dependency edges are needed in the task graph or other task dependency data structure.

4. Error Concealment for CPU-GPU Decoding Implementations

Figure 29:
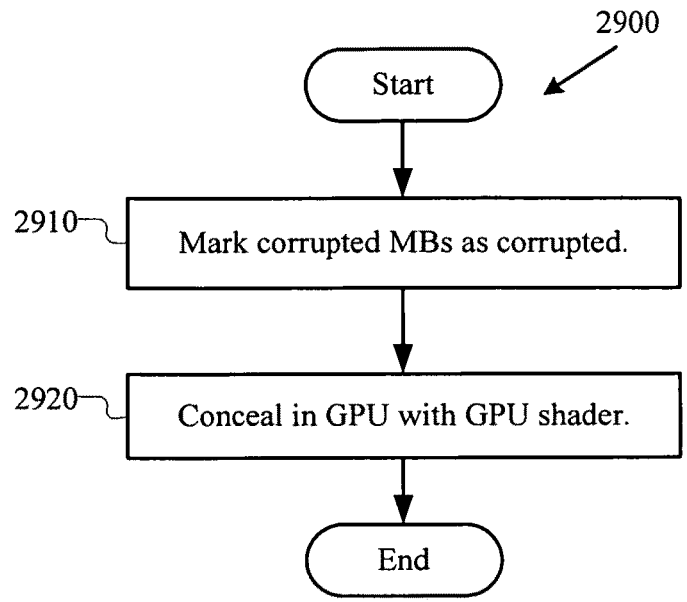

In certain decoding implementations that use GPUs, entropy decoding tasks are performed in CPU, but motion compensation, intra-prediction, and deblocking tasks are performed by a GPU. FIG. 29 shows a technique (2900) for using a nearest suitable neighbor for concealment in such GPU decoding implementations. A decoder such as the one described above with reference to FIG. 2 or other decoder performs the technique (2900).

When entropy decoding completes for all the slices in a picture, the decoder can typically detect whether there are any corrupted macroblocks in the picture. For those corrupted macroblocks, the decoder marks them as corrupted (2910). In a video acceleration module, the marked macroblocks can then go through an additional GPU task with an additional GPU shader, for error concealment (2920). This GPU shader, for example, tries to "copy" pixel data from the nearest suitable neighbor picture or sets sample values for the corrupted macroblocks to be black or another color.

Again, when such decoding implementations with video acceleration perform picture decoding in a serial order, one picture after the other, no additional dependency edges are needed in the task graph or other task dependency data structure.

5. Error Concealment for Decoding Implementations that Use Acceleration for Certain Entropy Decoding In certain GPU decoding implementations that use video acceleration for some entropy decoding operations (such as CABAC for residual data) as well as other downstream decoding tasks, SPS, PPS, and SEI NALUs are still parsed in the CPU. Errors in SPS, PPS or SEI NALUs may be detected and processed as stated in above. Some syntax elements in slice NALUs are also parsed in the CPU. Computationally intensive entropy decoding and other decoding tasks are performed using video acceleration modules, however, and detection of errors in individual macroblocks is problematic. Without notifications from upstream to indicate whether a slice NALU has some corruptions or not, video acceleration modules of the decoder have less ability to detect errors and perform error concealment.

Figure 30:
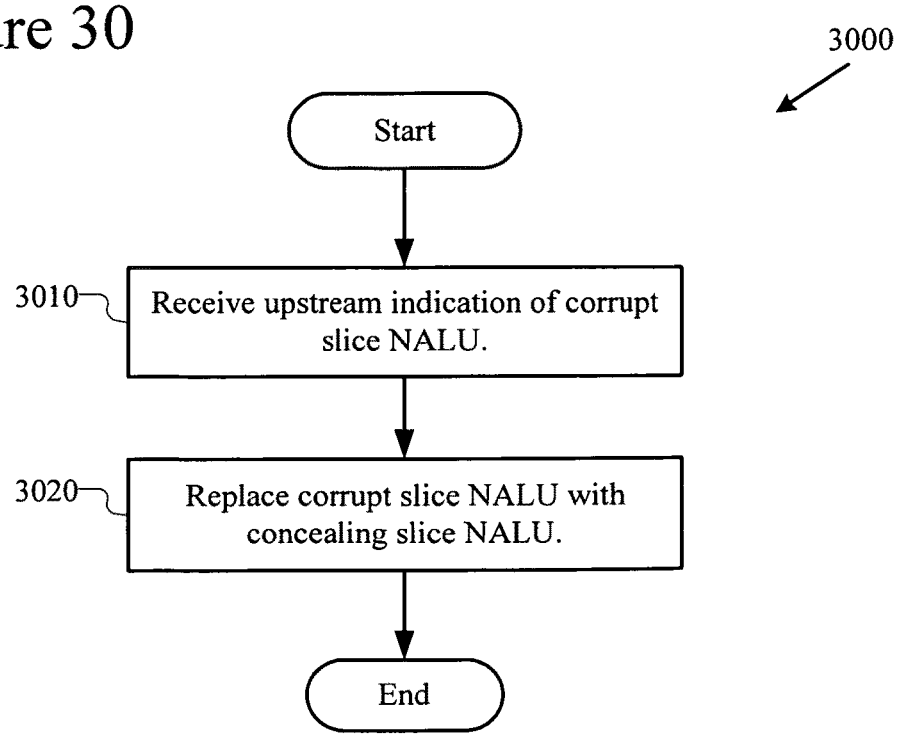

FIG. 30 shows a technique (3000) for using a nearest suitable neighbor for concealment in such decoding implementations. A decoder such as the one described above with reference to FIG. 2 or other decoder performs the technique (3000).

If indications from upstream decoding tasks are received which indicate corruptions in a slice NALU (3010), concealment can be performed for the slice as a whole (as opposed to performing error concealment on selected corrupt macroblocks within the slice). For a corrupt slice, the decoder replaces the slice NALU with a concealing slice NALU (3020). For example, the decoder replaces with corrupt slice NALU with a NALU for an I slice consisting of all IPCM macroblocks (with samples that are black or have another color value), if no suitable reference picture is available for the slice. If a suitable reference picture is available, the decoder replaces the corrupt slice NALU with a NALU for a P slice using zero motion for all macroblocks and references to the nearest neighbor picture in the DPB. Typically, the slice used for replacement covers all the areas in the original corrupted slice.

In these implementations and other implementations in which the decoder generates a new slice for concealment or replacement, the decoder can generate the concealing slice in the compressed domain. Or, the decoder can generate samples that the decoder encodes before the slice is fed into the video acceleration modules for decoding.

6. Adaptive Concealment Mode Switching

Different platforms have different capabilities to handle bit stream corruptions. Generally, software/CPU-only decoding can most effectively handle bit stream corruption, due to the availability of additional memory resources and better flexibility in detecting and handling errors. Decoding implementations that use video acceleration for some decoding tasks (but not entropy decoding) are second in terms of error concealment effectiveness, since the CPU can still detect many entropy decoding errors and modify the bit stream to facilitate error concealment in downstream decoding, but memory usage for reference pictures is more limited. Decoding implementations that use video acceleration for entropy decoding tasks are typically the least effective in terms of error concealment, due to poor error detection capabilities. In terms of general power consumption and performance/speed of video decoding, however, these different types of decoding implementations are ranked in a reverse order (video acceleration with entropy decoding, then video acceleration without entropy decoding, and then software/CPU decoding). Moreover, to secure video content, generally decoding with video acceleration is preferred, since it provides better content protection compared to software/CPU-only decoding.

Some decoding systems have the capacity and resources to switch between video decoding architectures. For example, a system can switch between CPU-only multithreaded decoding, GPU video acceleration of motion compensation and loop filtering, and GPU video acceleration of entropy decoding (as well as downstream decoding tasks). Hence, in some systems, assuming perfect bit streams, video acceleration of entropy decoding (and other decoding tasks) is preferred. If the decoder encounters corruption in a bit stream, the decoder switches to video acceleration of motion compensation, inverse frequency transforms and loop filtering (but not entropy decoding), for which computational performance is less efficient but error concealment is more efficient. If the decoder encounters even more corruption in the bit stream, the decoder needs better capabilities to handle corruptions, and the decoder switches to software/CPU decoding. If and when the decoder encounters less corruption in the bit stream, the decoder switches back to a more computationally efficient architecture that uses video acceleration. Other systems which employ such a switching mechanism may switch between different decoding architectures than in this example, however.

Depending on implementation, the decoder utilizes various metrics to determine when to switch among different platforms according to how corrupted the bit streams are. For example, the decoder considers metrics such as the frequency or count of NALUs discarded as corrupt, the frequency or count of corrupt slices, the frequency or count of corrupt macroblocks in slices, and/or the frequency or count of failed attempts to add reference pictures to a DPB. Generally, this can provide a better user experience by more effectively concealing errors as they increase in frequency, then switching to more computationally effective decoding modes as errors decrease in frequency.

H. Extensions

Although many of the innovations described herein are illustrated with reference to examples of H.264/AVC decoding, the innovations are typically applicable to decoding according to other standards such as VC-1 and MPEG-2, with corresponding changes to syntax elements.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for concealing an error in a bitstream of encoded video using a multithreaded video decoder, the method comprising:

in response to detection of an error in a bitstream of encoded video, identifying a suitable neighbor picture to use in error concealment for a current picture that is a current field, including, from a plurality of pictures represented in a decoded picture buffer ("DPB"):

determining a given picture from among the plurality of pictures represented in the DPB, including searching one or more of the pictures represented in the DPB that have parity the same as parity of the current picture, and then, if no suitable neighbor picture to use in error concealment for the current picture has been found, searching one or more of the pictures represented in the DPB that have parity opposite the parity of the current picture;

determining whether the given picture is decoded or set to be decoded; and determining whether the given picture is found within a predetermined threshold distance from the current picture;

adding, to a task dependency data structure for the multithreaded video decoder, a dependency between a task of the current picture and a task of the suitable neighbor picture; and after completion of the task of the suitable neighbor picture, performing error concealment that includes using areas of the suitable neighbor picture in place of corrupted areas of the current picture.

2. A method for concealing an error in a bitstream of encoded video during decoding in a video decoder, the method comprising:

in response to detection of an error in a bitstream of encoded video, determining, from one or more pictures represented in a decoded picture buffer ("DPB"), that a suitable neighbor picture to use in error concealment for a current picture exists in the DPB, including:

determining a given picture from among the one or more pictures represented in the DPB; and determining, based on one or more factors, that the given picture from the DPB is acceptable for use in error concealment as the suitable neighbor picture;

determining that a corrupted slice from the current picture is an I slice, the corrupted slice including one or more corrupted macroblocks;

in response to the determining that the corrupted slice from the current picture is an I slice, changing the I slice to a P slice;

changing one or more parameters for a reference list to include the suitable neighbor picture; and modifying parameters of the one or more corrupted macroblocks to facilitate error concealment using the suitable neighbor picture during decoding of the current picture.

3. The method of claim 2, wherein the current picture is a current field of an interlaced video frame, wherein the current field has a parity, and wherein the determining the given picture comprises:

searching those of the one or more pictures represented in the DPB that have parity the same as the parity of the current field; and if no suitable neighbor picture to use in error concealment for the current picture has been found, searching those of the one or more pictures represented in the DPB that have parity opposite the parity of the current field.

4. The method of claim 2, wherein the determining that the given picture from the DPB is acceptable comprises determining if the given picture from the DPB was skipped during decoding.

5. The method of claim 2, wherein:
the video decoder is a multithreaded video decoder; and
the method further comprises modifying a task dependency data structure such that error concealment for the current picture is dependent on completion of a decoding task for the suitable neighbor picture.

6. The method of claim 2, wherein:
the video decoder is implemented on a system utilizing video acceleration for motion compensation, inverse frequency transforms and/or loop filtering; and
the method further comprises verifying that the suitable neighbor picture is available for use in decoding that uses the video acceleration.

7. The method of claim 6, wherein the corrupted slice from the current picture is a first corrupted slice, wherein a second corrupted slice from the current picture is a P slice, and wherein:
the verifying includes determining if the suitable neighbor picture exists in a reference list for the second corrupted slice or if the reference list for the second corrupted slice can be expanded to include the suitable neighbor picture;
the method further comprises:
when the suitable neighbor picture cannot be included in the reference list for the second corrupted slice, using a first picture from the reference list of the second corrupted slice as the suitable neighbor picture; and
changing reference indices of one or more corrupted macroblocks in the second corrupted slice to refer to the suitable neighbor picture.

8. The method of claim 6, wherein the corrupted slice from the current picture is a first corrupted slice, wherein a second corrupted slice from the current picture is a B slice, and wherein:
the verifying includes determining if the suitable neighbor picture exists in reference lists for the second corrupted slice or if one of the reference lists for the second corrupted slice can be expanded to included the suitable neighbor picture;
the method further comprises:
when the suitable neighbor picture cannot be included in the reference lists for the second corrupted slice, using a first picture from a first of the reference lists of the second corrupted slice as the suitable neighbor picture; and
changing reference indices of one or more corrupted macroblocks in the second corrupted slice to refer to the suitable neighbor picture.

9. The method of claim 2, wherein:
the video decoder is implemented on a system utilizing a GPU for motion compensation, intra-prediction, and deblocking;
the method further comprises marking as corrupt the one or more corrupted macroblocks such that the GPU performs, using a GPU shader, an additional error concealment task utilizing the suitable neighbor picture.

10. The method of claim 2, wherein:
the video decoder is implemented on a system utilizing video acceleration for entropy decoding; and
after the modifying, the one or more corrupted macroblocks refer to the suitable neighbor picture and have zero motion.

11. The method of claim 2, wherein the one or more factors include parity of the current picture and the one or more pictures represented in the DPB.

12. The method of claim 2 wherein, for a given corrupted macroblock of the one or more corrupted macroblocks, the parameters include macroblock type, one or more reference indices and one or more motion vectors.

13. The method of claim 2, wherein the modifying includes, for a given corrupted macroblock of the one or more corrupted macroblocks:
setting macroblock type for the given corrupted macroblock;
changing one or more reference indices of the given corrupted macroblock to refer to the suitable neighbor picture; and
setting motion of the given corrupted macroblock to predicted motion for the given corrupted macroblock.

14. The method of claim 2, wherein the one or more factors include one or more of the following: predetermined threshold of temporal distance from the current picture, presence of corruption in the given picture from the DPB, distance between the given picture from the DPB and the current picture, and/or whether the given picture is skipped.

15. A video decoding system comprising one or more processors, memory and one or more storage media having stored thereon software for causing the system to perform operations for concealing an error in a bitstream during decoding, the software comprising:
code for, in response to detection of an error in a bitstream of encoded video, choosing, from one or more pictures represented in a decoded picture buffer ("DPB"), a suitable neighbor picture to use in error concealment for a current picture, including:
code for determining a given picture from among the one or more pictures represented in the DPB; and
code for determining, based on one or more factors, that the given picture from the decoded picture buffer is acceptable for use in error concealment as the suitable neighbor picture;
code for determining that a corrupted slice from the current picture is an I slice, the corrupted slice including one or more corrupted macroblocks;
code for, in response to the determining that the corrupted slice from the current picture is an I slice, changing the I slice to a P slice;
code for changing one or more parameters for a reference list to include the suitable neighbor picture; and
code for modifying parameters of the one or more corrupted macroblocks to facilitate concealment using the suitable neighbor picture during decoding of the current picture.

16. The system of claim 15, wherein the determining based on the one or more factors comprises analyzing one or more picture parameters for the given picture from the DPB, the picture parameters including: picture parity, an indication that the given picture is skipped during decoding, and picture order count.

17. The system of claim 15, wherein:
the decoding uses multithreaded decoding; and
the software further comprises code for modifying a task dependency data structure such that error concealment for the current picture is dependent on completion of a decoding task for the suitable neighbor picture.

18. The system of claim 15, wherein:
the decoding uses video acceleration hardware for motion compensation, inverse frequency transforms and/or loop filtering;
the modifying the parameters of the one or more corrupted macroblocks comprises changing reference indices of the one or more corrupted macroblocks to refer to the suitable neighbor picture.

19. The system of claim 15, wherein:
the decoding uses a GPU for motion compensation, intra-prediction and/or loop filtering;
the software further comprises code for marking as corrupt the one or more corrupted macroblocks in the current picture such that the GPU performs with a GPU shader an additional error concealment task utilizing the suitable neighbor picture.

20. The system of claim 15, wherein:
the decoding uses video acceleration hardware for entropy decoding; and
after the modifying, the one or more corrupted macroblocks refer to the suitable neighbor picture and have zero motion.

21. The system of claim 15, wherein the one or more factors include one or more of: (a) parity of the current picture and the one or more pictures represented in the DPB, (b) whether the given picture was skipped during decoding, (c) temporal distance between the current picture and the given picture, and/or (d) whether the given picture has corruption.

22. The system of claim 15, wherein, for a given corrupted macroblock of the one or more corrupted macroblocks, the parameters include macroblock type, one or more reference indices and one or more motion vectors.

23. The system of claim 15, wherein the modifying includes, for a given corrupted macroblock of the one or more corrupted macroblocks:
setting macroblock type for the given corrupted macroblock;
changing one or more reference indices of the given corrupted macroblock to refer to the suitable neighbor picture; and
setting motion of the given corrupted macroblock to predicted motion for the given corrupted macroblock.

24. A video decoding system comprising one or more processors, memory and one or more storage media having stored thereon software for causing the system to perform operations for concealing an error in a bitstream during decoding, the software comprising code for:
receiving at least part of a bitstream of encoded video;
detecting an error in the bitstream of encoded video;
in response to the detection of the error in the bitstream of encoded video, determining from one or more pictures represented in a decoded picture buffer ("DPB") a suitable neighbor picture to use in error concealment for a current picture;
determining that a corrupted slice of the current picture is an I slice, the corrupted slice including one or more corrupted macroblocks;
in response to the determining that the corrupted slice from the current picture is an I slice, changing the I slice to a P slice;
changing one or more parameters for a reference list to include the suitable neighbor picture; and
modifying parameters of the one or more corrupted macroblocks of the corrupted slice to facilitate error concealment using the suitable neighbor picture during decoding of the current picture, including, for a given corrupted macroblock of the one or more corrupted macroblocks:
setting macroblock type for the given corrupted macroblock;
changing one or more reference indices of the given corrupted macroblock to refer to the suitable neighbor picture; and
setting motion of the given corrupted macroblock to predicted motion for the given corrupted macroblock.

* * * * *